US010862723B2

(12) United States Patent
Boudreau et al.

(10) Patent No.: US 10,862,723 B2
(45) Date of Patent: Dec. 8, 2020

(54) MULTI-OFDM-PROTOCOL BEACON OPERATION

(71) Applicants: Gary Boudreau, Kanata (CA); Hassan Halabian, Ottawa (CA); Roland Smith, Nepean (CA)

(72) Inventors: Gary Boudreau, Kanata (CA); Hassan Halabian, Ottawa (CA); Roland Smith, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/318,625

(22) PCT Filed: Aug. 30, 2016

(86) PCT No.: PCT/IB2016/055182

§ 371 (c)(1),
(2) Date: Jan. 17, 2019

(87) PCT Pub. No.: WO2018/015796

PCT Pub. Date: Jan. 25, 2018

(65) Prior Publication Data

US 2019/0288894 A1 Sep. 19, 2019

Related U.S. Application Data

(60) Provisional application No. 62/365,691, filed on Jul. 22, 2016.

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0007* (2013.01); *H04L 27/0006* (2013.01);
(Continued)

(58) Field of Classification Search
CPC ............. H04L 27/0006; H04L 27/2602; H04L 27/2613; H04L 27/2666; H04L 5/0007;
(Continued)

(56) References Cited

U.S. PATENT DOCUMENTS

2015/0223075 A1 8/2015 Bashar et al.
2015/0223244 A1 8/2015 Tabet et al.
(Continued)

FOREIGN PATENT DOCUMENTS

| WO | 2014081421 A1 | 5/2014 |
| WO | 2016000835 A1 | 7/2016 |
| WO | 2016133726 A1 | 8/2016 |

OTHER PUBLICATIONS

Chave, Julien, International Search Report, PCT/IB2016/055182, EPO, Rijswijk, The Netherlands, dated Apr. 11, 2017.

*Primary Examiner* — Paul H Masur
(74) *Attorney, Agent, or Firm* — Ericsson Canada Inc.

(57) ABSTRACT

Methods and systems for multi-protocol beacon operation in shared spectrum (unlicensed band) are disclosed where an OFDM transmitter is configured to generate transmissions associated with one OFDM technology or protocol using subcarriers of another OFDM technology. In one application, an LTE transmitter (LTE-U) uses LTE subcarriers to generate an interpolated 802.11 (e.g. Wi-Fi) beacon transmission that can be understood by Wi-Fi receivers, for example to reserve the channel for a subsequent LTE transmission. For instance a W-LAN preamble is generated where STF and LTF fields consist in respectively 12 and 52 subcarriers mapped at their respective frequency locations among the 2048 LTE subcarriers with the remaining subcarriers set to 0. In some implementations, the use of beacons can be useful in implementations where it is desirable to gain prioritized access to reserve the channel. Examples of suitable LTE transmissions that would benefit
(Continued)

from prioritized channel access include delay or time-sensitive LTE transmissions or transmissions that must occur within a certain time window and/or with a certain periodicity such as LTE control data or signals (e.g. PDCCH), and/or synchronization or reference signals such as the Discovery Reference Signal (DRS) for LAA-LTE). An LTE transmitter can exploit the 802.11 channel access to gain prioritized channel access for transmitting 802.11 Wi-Fi beacons generated using its LTE subcarriers to ensure LTE transmissions take priority over other types of LTE and/or Wi-Fi traffic.

16 Claims, 16 Drawing Sheets

(51) Int. Cl.
*H04L 27/00* (2006.01)
*H04W 16/14* (2009.01)

(52) U.S. Cl.
CPC ...... *H04L 27/2602* (2013.01); *H04L 27/2666* (2013.01); *H04W 16/14* (2013.01)

(58) Field of Classification Search
CPC . H04W 72/04; H04W 72/0406; H04W 74/02; H04W 16/14
See application file for complete search history.

(56) References Cited

U.S. PATENT DOCUMENTS

| | | | |
|---|---|---|---|
| 2015/0271847 A1* | 9/2015 | Luo | H04L 5/0064 370/329 |
| 2016/0095110 A1* | 3/2016 | Li | H04W 72/1215 370/329 |
| 2016/0095120 A1* | 3/2016 | Gaal | H04L 5/0051 370/329 |
| 2016/0248555 A1* | 8/2016 | Lei | H04L 5/0005 |
| 2017/0257776 A1* | 9/2017 | Agardh | H04W 74/0816 |

\* cited by examiner

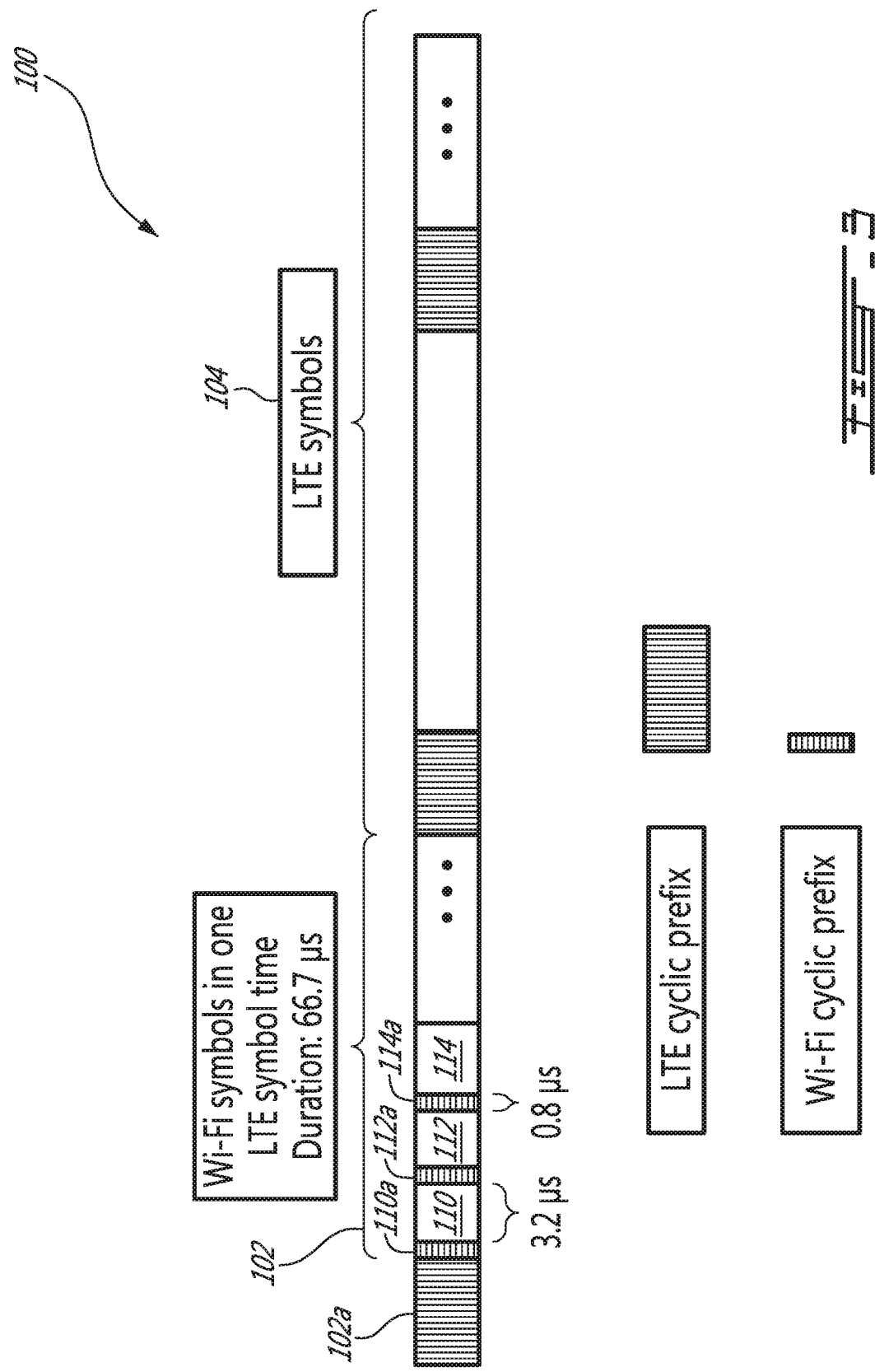

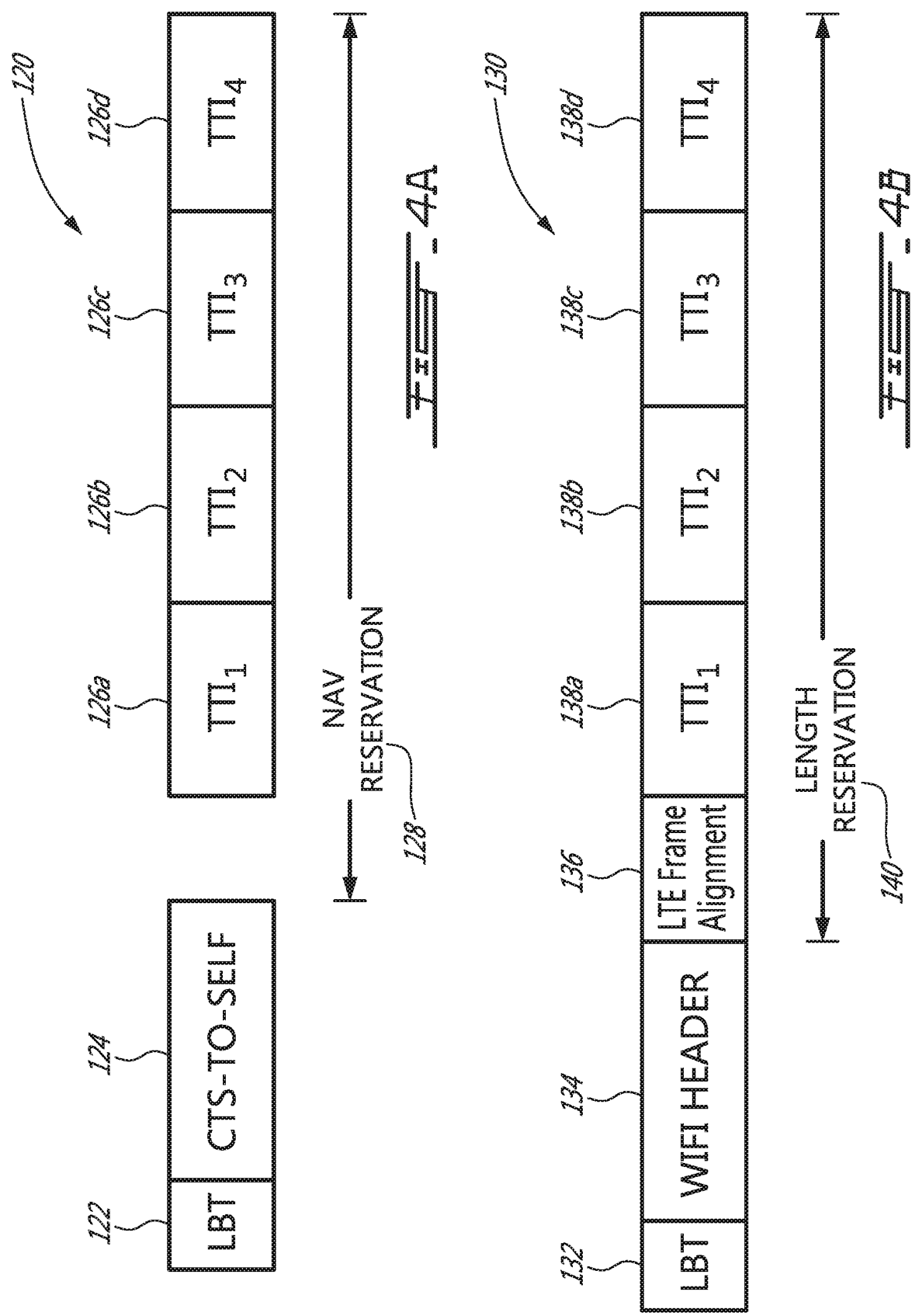

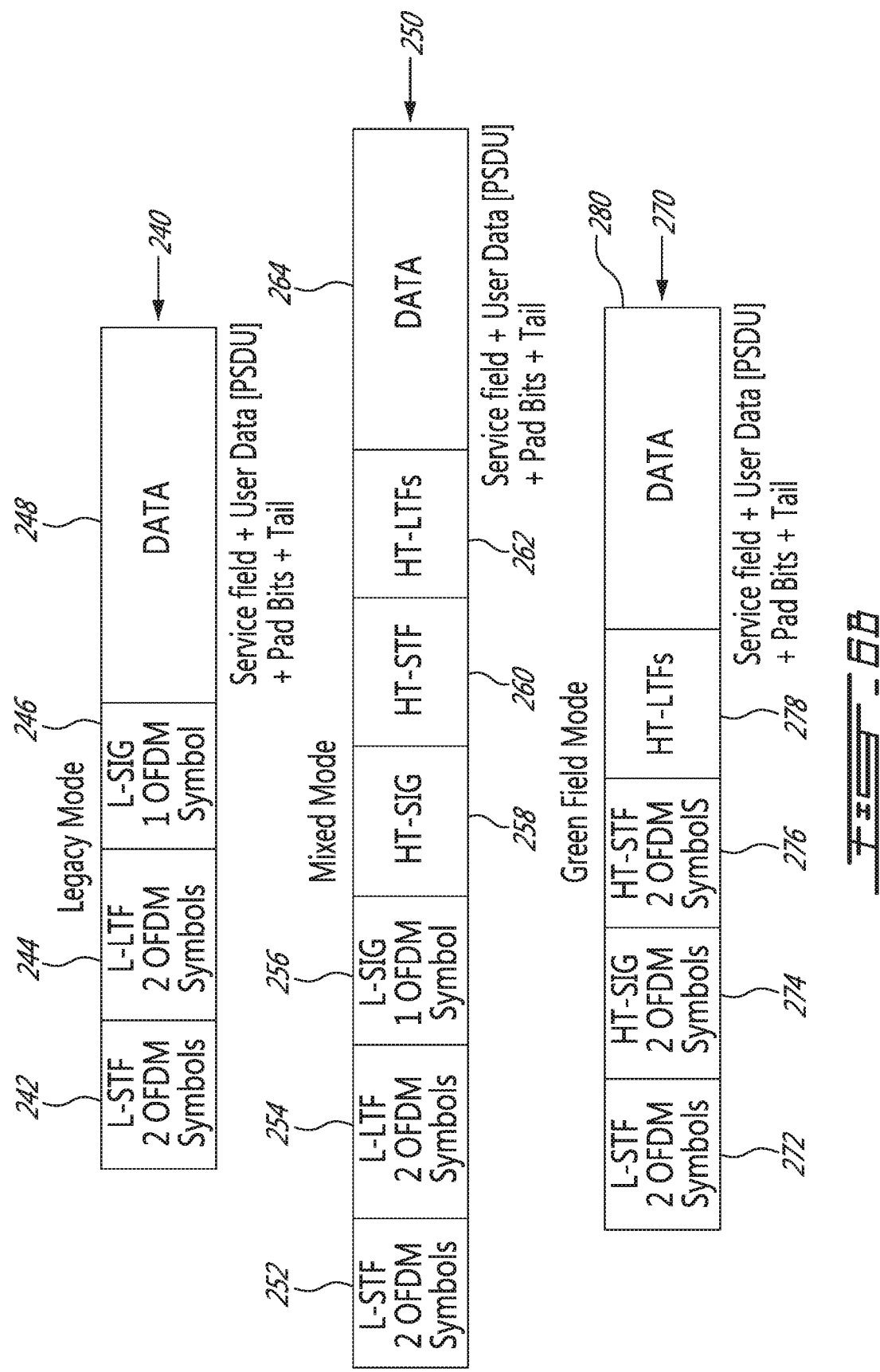

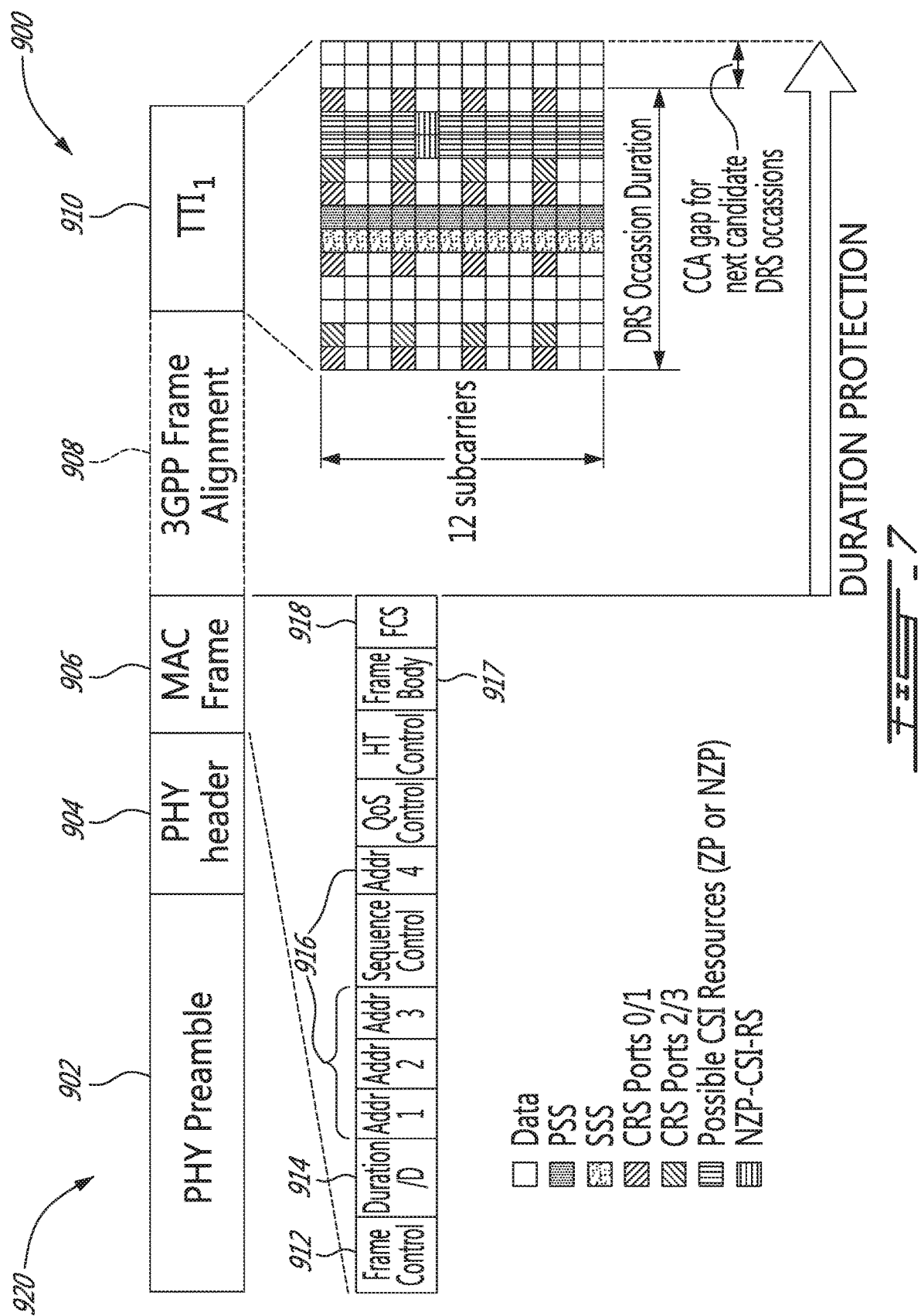

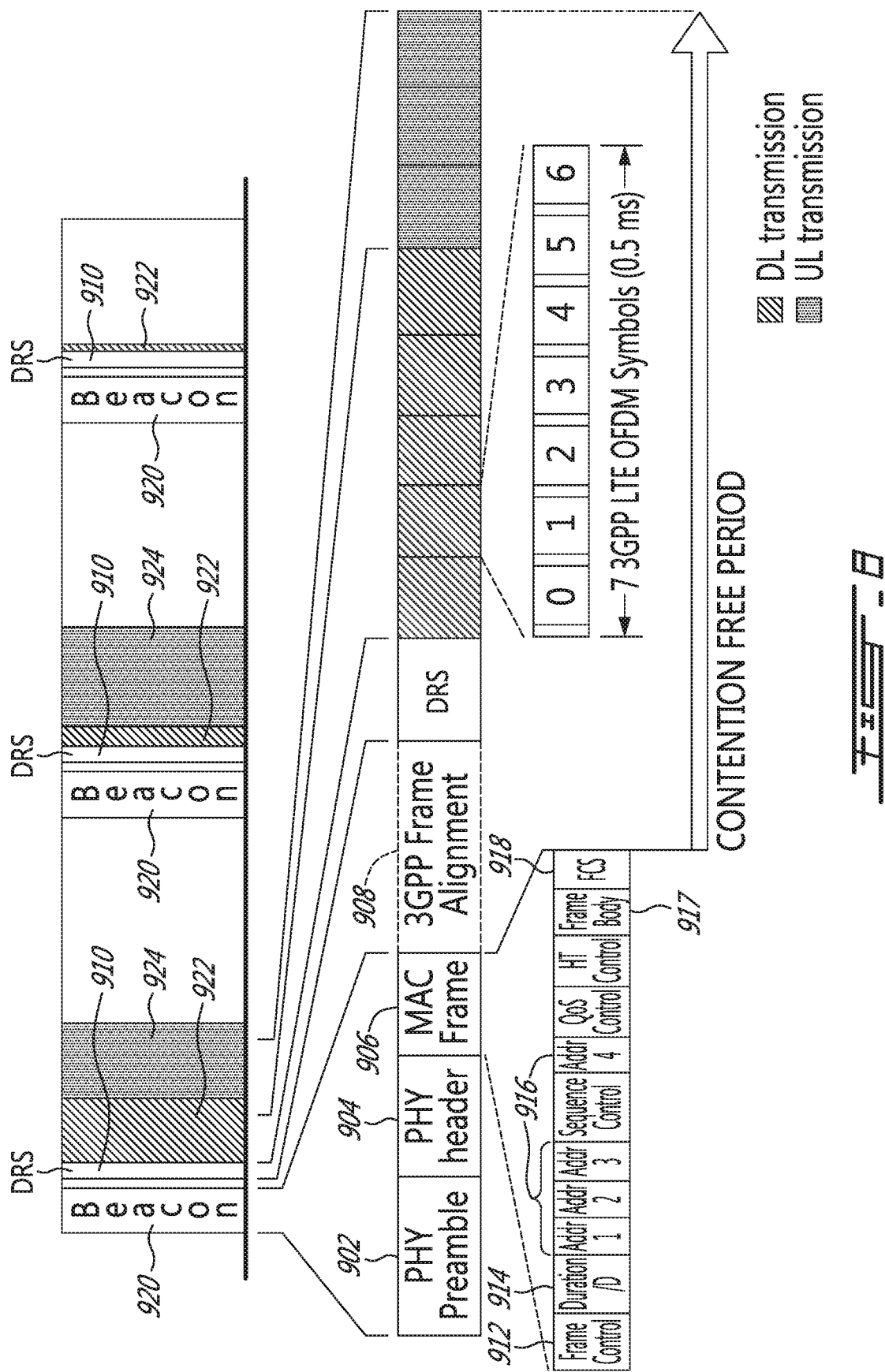

MULTI-OFDM-PROTOCOL BEACON OPERATION

RELATED APPLICATIONS

This application is a 35 U.S.C. § 371 national phase filing of International Application No. PCT/IB2016/055182, filed Aug. 30, 2016, which claims the benefit of provisional patent application Ser. No. 62/365,691, filed Jul. 22, 2016, the disclosures of which are hereby incorporated herein by reference in their entireties.

TECHNICAL FIELD

The present disclosure relates to wireless communication systems and in particular a method and system for multi-protocol beacon operation in wireless communication networks.

BACKGROUND

Orthogonal frequency-division multiplexing (OFDM) has become a key encoding method used by many communications technologies ranging from wireline to wireless technologies. In fact, OFDM use is pervasive, being employed by many technologies including, but not limited to, wired communications such as Digital Subscriber Loop (DSL), Asymmetric DSL (ADSL) and Very-high-bit-rate DSL (VDSL) broadband access technology over Plain Old Telephone Service (POTS) copper wiring, Digital Video Broadcasting (DVB), Power Line Communications (PLC), ITU-T G.hn for home wiring LANs, telephone modems, DOCSIS—Data Over Cable System Interface Specification for broadband delivery, MoCA—Multimedia Over Coax Alliance home networking, and wireless communications including IEEE 802.11 (e.g. Wi-Fi), HIPERLAN, Digital TV, Personal Area Networks (PAN), and Ultra Wideband Networks (UWB).

OFDM and its multiple access variant OFDMA continue to find increasing applications, for example in $3^{rd}$ Generation Partnership Project (3GPP)-based wireless networks such as Long Term Evolution (LTE) and Evolved Universal Mobile Telecommunications System Terrestrial Radio Access (E-UTRA) networks, but also in IEEE-based networks such as Mobile Broadband Wireless Access (MBWA, also referred to as IEEE 802.20). Next Generation mobile networks are planning to use OFDM as the platform for this new and exciting product evolution, and even the Wireless Gigabit Alliance (WiGig) plans to use OFDM in the 60 GHz frequency band to enable conference room cell sizes to achieve 100 Gigabits per second (Gbps) data rates.

Although these technologies are all based on OFDM, they have significant differences in their technology implementations. OFDM is a digital modulation technique that uses frequency division multiplexing to create multiple orthogonal sub-carriers to carry parallel data streams. Sub-carriers are modulated using conventional modulation schemes such as Binary Phase Shift Keying (BPSK) or Quadrature Amplitude Modulation (QAM) with defined symbol rates enabling multiple parallel data streams to be carried.

The detailed implementations for these various technologies are all quite different, largely driven by channel limitations or restrictions, and desired operational features. For example, 802.11a Wi-Fi employs short 3.2 microsecond (μs) symbols (with 0.4 or 0.8 ρs for the cyclic prefix), and 52 carriers spaced at 312.5 kHz to create a high speed data channel capable of withstanding the low dispersion experienced in short reach indoor channels which Wi-Fi APs typically address, while LTE typically employs longer 66.7 ρs symbols (or 71.4 ρs with the cyclic prefix) with 15 kHz spaced subcarriers to address significant inter-symbol interference issues typical of long reach outdoor cellular channels.

Implementations differ by symbol time and sub-carrier spacing, but also by many other physical layer parameters including the number of sub-carriers, channel spacing, Fast Fourier Transform (FFT) size, number and operation of pilot tones, convolutional codes employed, Forward Error Correction (FEC) design, sub-carrier modulation schemes, time-interleaving, equalizer operation, and Multiple-Input Multiple-Output (MIMO) operation to name a few. Moreover, with the Medium Access Control (MAC) layer defining how the OFDM based physical medium is used by higher layer applications, OFDM designs are inherently complex and specific to a particular OFDM technology. As a result, the implementation of interworking functions with other OFDM based technologies has proven to be very difficult.

Nevertheless, with the explosion of wireless technologies in unlicensed spectrum such as the Unlicensed National Information Interchange (U-NII) bands managed by the Federal Communications Commission (FCC) in the United States, there is a desire to see upcoming technologies such as LTE work together to share this spectrum fairly with incumbents such as 802.11 (e.g. Wi-Fi) the dominant technology, and provide a positive end user experience. 3GPP and some to come 5G licensed networks will shortly begin trials to offer services in unlicensed bands. License Assisted Access for Long Term Evolution (LAA-LTE or LAA), as the first example, has recently demonstrated cabled operation at Mobile World Congress in March of 2015 using the 5 GHz band. Product rollouts are planned in 2016 and 2017. However, concerns over interoperability of these different technologies have been raised, driven by expectations of wide scale deployment of LTE radios into the unlicensed bands.

Since the FCC first made available spectrum in the 5 GHz band for U-NII operation in 1997, an etiquette protocol for medium access was developed for Wi-Fi systems which can be generalized into three rules:
1. Listen Before Talk (LBT)—Do not use the channel if Radio Frequency (RF) energy above a threshold (e.g. −62 dBm) is detected,
2. Carrier Sense—Do not use the channel if a Wi-Fi preamble (or related pilot tones) is detected, and
3. Virtual Carrier Sense—Do not use the channel while a channel busy timer (e.g. the Network Allocation Vector (NAV)) is counting down to zero.

In W-Fi systems, the Clear Channel Assessment (CCA) function employs these simple etiquette rules to ensure that many W-Fi devices can share the same unlicensed channel fairly, and avoid transmission collisions which may have deleterious effects to both the interferer and interferee.

With the introduction of new 3GPP-based cellular technologies such as LTE and soon to be 5G into the unlicensed bands, an expanded etiquette will be required. Wi-Fi, as the main incumbent technology, has a defined etiquette. However, Wi-Fi does not address the complexities and requirements of 3GPP systems. Although they both use OFDM and both support a number of common features at the physical layer, 3GPP and W-Fi are fundamentally different.

One of the most fundamental differences is synchronization. W-Fi operates asynchronously by applying the etiquette rules and sending/receiving packets when the medium is free. In contrast, 3GPP operates synchronously and employs advanced scheduling algorithms to maximize channel utilization, and therefore is not burdened with etiquette rules. As a result, 3GPP is able to carry higher traffic loads efficiently i.e. in a way that maximizes the use of the valuable frequency channel resources.

Because of this and other notable differences in OFDM implementation, 3GPP-based technologies are not currently designed to support a sharing etiquette, such as that which W-Fi supports.

Different possible solutions have been proposed so far claiming to have the potential for improving fair sharing. One such proposal includes implementing a power-based LBT detect threshold. With this proposal, the LTE radio would monitor energy on the channel and consider it free if the received signal strength indication (e.g. RSSI) is lower than that threshold. However, this proposal does not address the variability of cell sizes due to unlicensed band interference. Also, in some implementations, the threshold is fairly large (−62 dBm) and limits the cell size. Depending on the channel conditions, there is no guarantee that the LTE radio will detect a transmitted signal above the threshold and this ultimately may result in a higher collision count and lower throughput.

Other proposals contemplate using a Wi-Fi receiver in the LTE radio to monitor and detect Wi-Fi pilot tones and/or transport LTE data using Wi-Fi packets. However, these proposals would involve significant hardware and software development and would not be backward compatible to existing LTE radios currently deployed. Moreover, this proposal combines transceivers which are fundamentally different to try and create a coordinated design. In doing so, it mixes the performance and regulatory aspects of two separate and independent radio transceivers, making the solution extremely complex to design, verify, and have certified since all of the key design parameters such as power control, AGC, power spectral density, PAR reduction techniques, and PA linearization techniques such as digital pre-distortion are now operating on two separate PHY devices.

Accordingly, to address some or all of the drawbacks noted above, there is a need for improved method and systems to facilitate co-existence in shared spectrum.

SUMMARY

Methods and systems for multi-protocol transmissions in shared spectrum are disclosed. According to principles described herein, an OFDM transmitter is configured to generate transmissions associated with one OFDM technology or protocol using subcarriers of another OFDM technology.

In one application, an LTE transmitter uses LTE subcarriers to generate an 802.11 (e.g. W-Fi) beacon transmission that can be understood by W-Fi receivers, for example to reserve the channel for a subsequent LTE transmission. In some implementations, the use of beacons can be useful in implementations where it is desirable to gain prioritized access to reserve the channel. Examples of suitable LTE transmissions that would benefit from prioritized channel access include delay or time-sensitive LTE transmissions or transmissions that must occur within a certain time window and/or with a certain periodicity such as LTE control data or signals (e.g. PDCCH), and/or synchronization or reference signals such as the Discovery Reference Signal (DRS) for LAA-LTE). An LTE transmitter can exploit the 802.11 channel access to gain prioritized channel access for transmitting 802.11 Wi-Fi beacons generated using its LTE subcarriers. Use of a beacon for channel reservation can advantageously "protect" the delay or time-sensitive LTE transmissions and ensure that they take priority over other types of LTE and/or Wi-Fi traffic.

The embodiments described are primarily in relation to the generation and transmission of 802.11 beacon information using LTE subcarriers. However, the same approach is equally applicable to other OFDM technologies such as for example 802.15 technologies (e.g. ZigBee). Generally, the principles described herein are applicable to any implementation where subcarriers or symbol information from one OFDM technology are used to transmit subcarrier or symbol information using subcarriers of another OFDM technology. In some embodiments, the principles described herein are applicable to generate any possible signal to the extent allowed by the spectral bandwidth available to the OFDM transmitter. In addition, the principles are equally applicable to other non-OFDM technologies or to generate non-OFDM signals. For example, the principles described herein may be employed to generate IEEE 802.11b CCK signals, using subcarriers or symbol information from one OFDM technology. The principles described within may even be applied to signal generation for applications yet undetermined, a possible example being in-building "radar", using specialized signals to detect and characterize in-building objects for the purpose of high precision location tracking.

In one broad aspect, there is provided a method for an OFDM transmitter configured for transmission of a first set of OFDM symbols using a first plurality of subcarriers having a first subcarrier frequency spacing defining a first symbol duration. The method includes generating a first OFDM signal containing control data associated with a first OFDM communication protocol, generating a second OFDM signal containing beacon data associated with a second OFDM communication protocol, transmitting, using the first plurality of subcarriers, the second ODFM signal as a second set of OFDM symbols, each having a second symbol duration smaller than the first symbol duration, and transmitting, using the first plurality of subcarriers, the first OFDM signal as a first set of OFDM symbols, each having a first symbol duration.

In one implementation, the first OFDM signal is generated based on a first predetermined OFDM signal containing the control data associated with the first OFDM communication protocol and the second OFDM signal is generated based on a second predetermined OFDM signal containing the beacon data associated with the second communication protocol.

In another implementation, generating the first OFDM signal includes mapping the first predetermined OFDM signal to the first plurality of subcarriers and generating the second OFDM signal includes mapping the second predetermined OFDM signal to the first plurality of subcarriers. In yet another implementation, generating the second OFDM signal further includes generating the second predetermined OFDM signal, and interpolating the second predetermined OFDM signal generated using the first plurality of subcarriers to produce an interpolated OFDM signal that can be mapped to the first plurality of subcarriers.

In yet another implementation, the first predetermined OFDM signal includes a first set of modulation values for the first plurality of subcarriers, the first set of modulation values corresponding to the control data associated with the first OFDM communication protocol, and the second predetermined OFDM signal includes a second set of modulation values for the first plurality of subcarriers, the second set of modulation values corresponding to the beacon data associated with the second OFDM communication protocol.

In yet another implementation, the first predetermined OFDM signal includes a periodic control signal and wherein the second predetermined OFDM signal includes a beacon frame. In yet another implementation, the first predetermined OFDM signal includes a Discovery Reference Signal (DRS).

In yet another implementation, the beacon frame is indicative of one of a transmission length, transmission time, transmission type, a channel reservation time and a contention-free period associated with at least the DRS. In yet another implementation, the beacon frame is indicative of one of a transmission length, transmission time, transmission type, a channel reservation time and a contention-free period associated with the first OFDM signal and at least one of a downlink OFDM transmission and an uplink OFDM transmission. In yet another implementation, the beacon frame includes a Hybrid Coordination Function (HCF) beacon.

In yet another implementation where, for example, it may be desirable to broadcast the presence of the OFDM transmitter, the beacon frame includes at least one parameter for the OFDM transmitter associated with one of the first and second OFDM communication protocols. In yet another implementation, the at least one parameter for the OFDM transmitter and associated with the second OFDM communication protocol includes at least one of a Service Set Identifier (SSID), a supported rate, a country, a Quality of Service (QoS), a neighbor list, a radio Medium Access Control (MAC) address, an Ethernet MAC address, and a MAC address of an associated Access Point (AP). In yet another implementation, the at least one parameter for the OFDM transmitter and associated with the first OFDM communication protocol includes at least one of a Cell Identifier (CID), a transmit power, a received interference power and a thermal noise power, a phase/frequency synchronization status, a Transport Network (TN) bandwidth, a TN latency, a TN jitter, and a TN availability.

In another broad aspect, there is provided an OFDM transmitter configured for transmission of a first set of OFDM symbols using a first plurality of subcarriers having a first subcarrier frequency spacing defining a first symbol duration. The OFDM transmitter includes circuitry containing instructions which, when executed, cause the transmitter to perform any of the method implementations described above.

In yet another broad aspect, there is provided a non-transitory computer readable memory configured to store executable instructions for an OFDM transmitter configured for transmission of a first set of OFDM symbols using a first plurality of subcarriers having a first subcarrier frequency spacing defining a first symbol duration. The executable instructions when executed by a processor cause the OFDM transmitter to perform any of the method implementations described above.

Advantageously, some implementations of the present principles do not require a separate Wi-Fi transmitter as required in existing co-existence proposals. In other implementations, the W-Fi information may be generated using hardware configured for LTE transmissions and therefore help ensure the Wi-Fi transmissions meet requirements imposed on LTE systems such as, for example, power spectral density, and maximum transmission power. In other implementations, the interference-free cell size is increased by at least 20 dB, for example from −62 dBm (free channel threshold) to over −82 dBm which is the sensitivity level considered standard for W-Fi systems using 6 Mbps Binary Phase Shift Keying (BPSK). In yet other embodiments, the cell size is increased by a 10-fold factor due to use of a lower detection threshold.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIG. 3 illustrates a timing diagram showing an example of W-Fi symbols transmitted by an LTE node in the LTE RAN of FIG. 1, in accordance with the principles described herein;

FIGS. 4A-B illustrate timing diagram examples of W-Fi transmissions by an LTE node in the LTE RAN of FIG. 1 for channel reservation in an unlicensed band in accordance with the principles described herein;

FIGS. 6A-B illustrate format examples for the W-Fi header transmission shown in FIG. 4B in accordance with the principles described herein;

FIG. 7 illustrates an example of a W-Fi beacon frame transmission for channel reservation of a Discovery Reference Signal (DRS) transmission in accordance with the principles described herein;

FIG. 8 illustrates an example of a Hybrid Coordination Function (HCF) Wi-Fi beacon frame transmission for channel reservation of a DRS and/or downlink/uplink transmissions in accordance with the principles described herein;

DETAILED DESCRIPTION

The present disclosure is directed to methods and systems for multi-protocol transmissions in shared spectrum e.g. unlicensed bands or band normally used for unlicensed access. The principles described herein are applicable to generating subcarriers or symbol information associated with one OFDM technology using another OFDM technology.

The description that follows describes how nodes in a first or base OFDM network (e.g. a License Assisted Access (LAA)—Long Term Evolution (LTE) Radio Access Network (RAN)) configured to transmit subcarrier and/or symbol information of a first OFDM type can also transmit subcarrier and/or symbol information of a second OFDM type which can be detected by wireless devices in one or more second OFDM network(s) such as for example, a Wireless (e.g. Wi-Fi) Local Area Network (WLAN). However, those having ordinary skill in the relevant art will readily appreciate that the principles described herein may equally apply to other types of networks.

For example, the first OFDM network may also include other 3$^{rd}$ Generation Partnership Project (3GPP) networks (e.g. Universal Mobile Telecommunications System (UMTS), LTE-Advanced (LTE-A)), LTE-Unlicensed (LTE-U), Generation (4G), 5th Generation (5G) or other future generations of a 3GPP communication network infrastructure. More generally, the first OFDM network may include any current or future wireless network infrastructure configured to generate subcarriers or symbol information associated with a different OFDM technology, with or without a licensed anchor band (so called "standalone" or single carrier access network).

Similarly, the second OFDM network(s) described herein primarily as WLANs (e.g. Wi-Fi) may also include other types of 802 networks such as a Wireless Personal Area Networks (WPAN) or a Wireless Metropolitan Area Networks (WMAN). However, the second OFDM network(s) may also include wireless networks that use a different OFDM technology such as for example 802.15 networks (e.g. ZigBee). More generally, the second wireless network (s) may include any OFDM network that uses a subcarrier spacing equal to or greater than the subcarrier spacing used in the first OFDM network. This is intended to include OFDM networks which are variations of the OFDM technology used in the first OFDM network but with a greater subcarrier spacing (e.g. a second LTE network with a subcarrier spacing greater than the carrier spacing of a first LTE network). For clarity and as used herein, the term WLAN or Wi-Fi is used to cover all of these possibilities for the second OFDM network(s).

Figure 1:
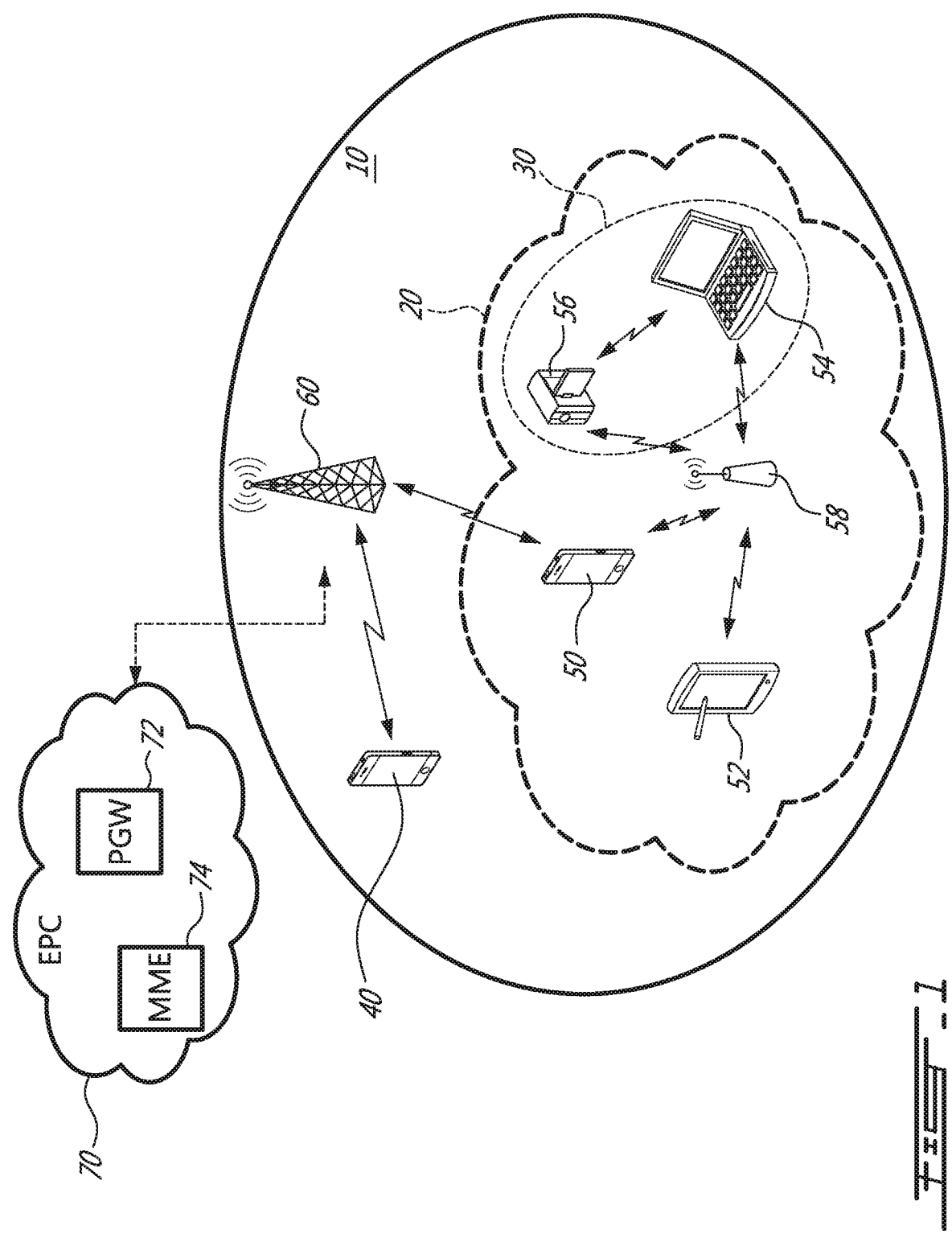
FIG. 1 illustrates one example of a Long Term Evolution (LTE) Radio Access Network (RAN) and Wireless Local Area Networks (WLANs) configured to share unlicensed spectrum resources, in accordance with the principles described herein.

Referring now to FIG. 1, there is shown one example of an LAA-LTE RAN 10 (an example of the first OFDM network) in which an access node 60 is configured to transmit subcarrier and/or symbol information which can be detected by wireless devices 50, 52, 54, 56, 58 operating in WLANs 20, 30 (examples of a second OFDM network). As is conventional for LAA operation, the unlicensed band is used to operate a (secondary) carrier to add capacity to a (primary) carrier operating in licensed spectrum (e.g. an LTE carrier). Operation of the primary licensed carrier may be under the control of the access node 60 or another node in the LAA-LTE RAN 10.

The access node 60 is an eNodeB but in other implementations, the access node 60 may be a Node B (NB), evolved Node B (eNB), base station, base station controller (BSC), radio network controller (RNC), relay, donor node controlling relay, base transceiver station (BTS), transmission point, transmission node, remote RF unit (RRU), remote radio head (RRH), a node in a distributed antenna system (DAS), or a memory management unit (MMU). Generally, the access node 60 is configured to control transmissions to or from UEs in the LTE RAN 10 but other nodes in the LTE RAN 10, a Core Network (CN) 70 or in a network outside of a RAN/CN infrastructure (e.g. an Internet Protocol (IP) node in an IP network) may be configured for that purpose. In other implementations, a wireless device or UE (for example, a relay node UE) may be configured to transmit subcarrier and/or symbol information which can be detected by devices that use a different OFDM technology (e.g. devices in the WLANs 20, 30). It is to be understood that the functionality described herein in relation to nodes that are configured to transmit such subcarrier or symbol information in a wireless network may also equally apply to wireless devices (e.g. UEs) configured as such.

In FIG. 1, the access node 60 provides wireless devices within its coverage (e.g. devices 40, 50) with access to network services in one more core networks 70, in this example, an Evolved Packet Core (EPC) network which includes a Mobility Management Entity 74 and a Packet Data Network (PDN) Gateway (PGVV) 72. Each wireless device 40, 50 is configured for wireless communication in the LAA-LTE RAN 10 (e.g. as a User Equipment (UE) and may be of any type, including, for example a wireless terminal (also known as a mobile station, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a heart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device.

In the example of FIG. 1, the LAA-LTE RAN 10 shares the unlicensed band with WLANs 20, 30 for transmissions involving at least some of the wireless devices in its coverage (e.g. wireless device 50). Generally, the WLANs 20, 30 may each include any number of wireless devices communicating directly or via an Access Point (AP) with other devices in the same or different networks. In the example of FIG. 1, WLAN 20 is shown to include WLAN devices 52, 54, AP 58 as well as wireless device 50 while WLAN 30 includes WLAN devices 54 and 56. Other network configurations for WLANs 20, 30 or other types of networks or devices which may share unlicensed spectrum resources with device 50 in the LAA-LTE RAN 10 are possible.

As is conventional, devices 50, 52, 54 and AP 58 in WLAN 20 and devices 54, 56 in WLAN 30 (herein generically referred to as WLAN or Wi-Fi devices) are configured to share a band of spectrum using some form of media access method and/or transmissions based on contention. As is well-known, there are many examples of such contention-based approaches. Examples include Listen-Before-Talk (LBT), Carrier Sense Multiple Access (CSMA)—with Collision Detection (CSMA-CD), CSMA with Collision Avoidance (CSMA—CA), etc. Using a contention-based method, a WLAN device 50, 52, 54, 56, 58 will try to determine whether another transmission is in progress in the channel or band used. This determination may be based on the detection of a carrier wave, signal or energy in the channel of interest. If a carrier or energy is detected in the channel of interest (in another fully or partially overlapping channel), the WLAN device 50, 52, 54, waits for the transmission in progress to finish before initiating its own transmission.

In the example of FIG. 1, the LAA-LTE RAN 10 may include wireless devices 40 in a location outside the coverage of WLANs 20, 30, and with which spectrum resources are not shared. As a result, the wireless devices 40, 50 described in the embodiments herein may (but do not need to) be configured for operation on multiple different wireless networks. In the example of FIG. 1, wireless device 50 is configured as a dual-mode device (i.e. configured as a UE for operation in the LAA-LTE RAN 10 as well as a WLAN device for operation in WLANs 20, 30) while wireless device 40 is configured as a UE for operation in the LAA-LTE RAN 10 only. For clarify, the principles of the present disclosure apply whether or not wireless devices 40, 50 in the LAA-LTE RAN 10 are configured as single-mode or multi-mode devices.

Figure 2A:
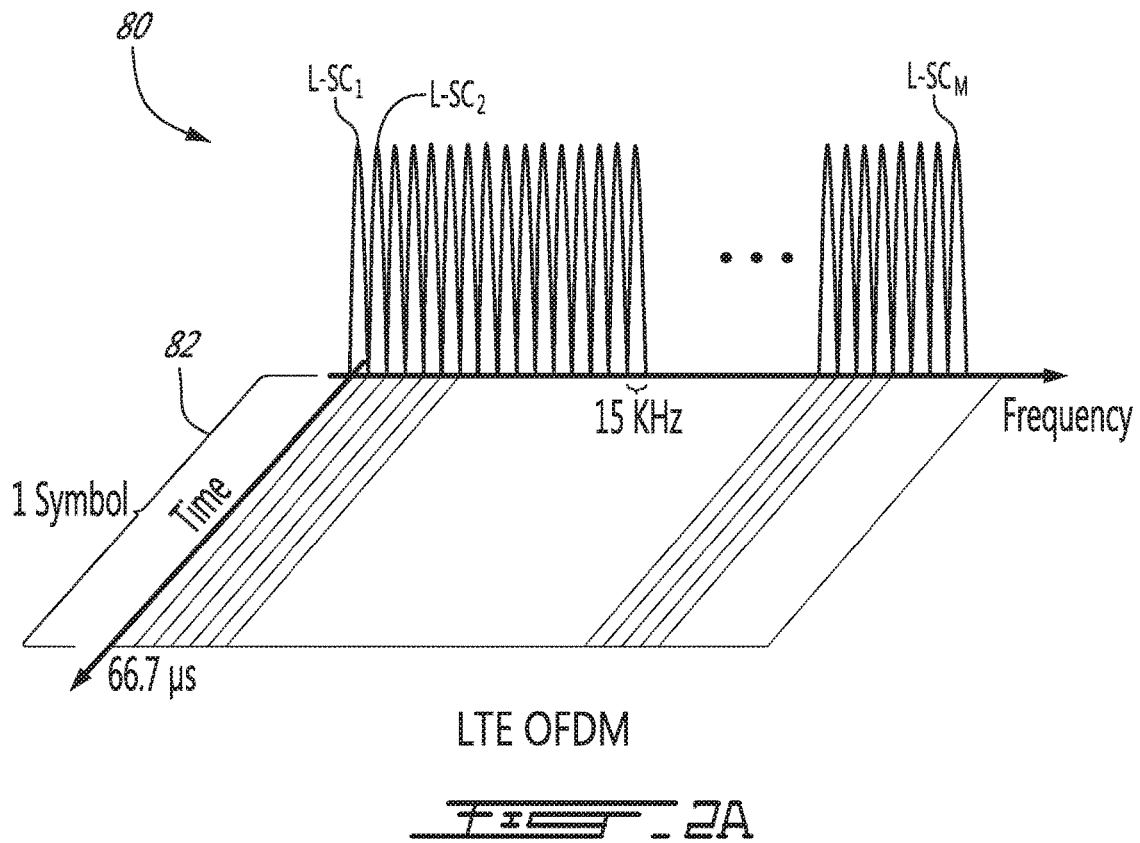
FIGS. 2A-B illustrate an example of LTE subcarriers and W-Fi subcarriers used in the LTE RAN and WLANs of FIG. 1, in accordance with the principles described herein.

3GPP systems such as the LAA-LTE RAN 10 of FIG. 1 typically operate outdoors, usually from high powered macros cell sites designed to cover ranges up to several kilometers. The resulting coherence bandwidth of the channel is very small as the delay spread (i.e. the impulse response of the channel) can be quite large due to distant reflections from building and other environmental factors. To address this issue, 3GPP systems break the available bandwidth into many narrower sub-carriers or sub-channels and transmit the data in parallel streams. FIG. 2A shows a time-frequency diagram 80 of a set of LTE sub-channels (only a subset shown) used in a channel of the LTE RAN 10 of FIG. 1. The LTE sub-channels are 15 KHz wide and correspond to a set of LTE sub-carriers L-SC$_{1-M}$, typically 1200 (M=1200) for a 20 MHz channel. In that example, each LTE subcarrier L-SC$_{1-M}$ is modulated using varying levels of QAM modulation, e.g. QPSK, QAM, 64QAM or possibly higher orders depending on signal quality. Each OFDM symbol 82 is therefore a linear combination of the instantaneous signals on each of the sub-carriers L-SC$_{1-M}$ in the channel. Because data is transmitted in parallel rather than serially, LTE symbols 82 are generally much longer than symbols on single carrier systems of equivalent data rate. In the example of FIG. 2A, each LTE symbol 82 is 66.7 microseconds (μs) long and is preceded by a 4.7 ρs cyclic prefix (CP) (not shown), which is used to reduce Inter-Symbol Interference (ISI). The total symbol length (including the CP) is 71.4 ρs.

Figure 2B:
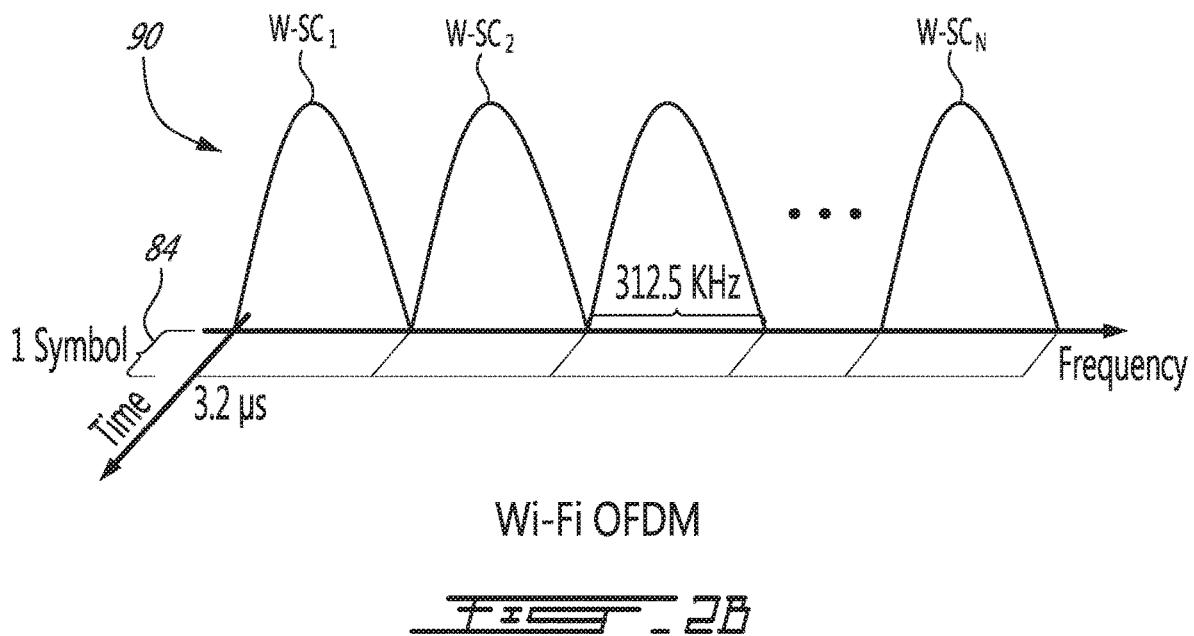

In contrast, Wi-Fi systems operate (mostly) indoors, usually from low power APs designed to cover ranges up to 50 or 100 meters. The resulting coherence bandwidth of the channel is large, as the delay spread (e.g. the impulse response of the channel) is usually very short, typically less than 500 nanoseconds (ns). As a result, Wi-Fi systems use wider 312.5 KHz sub-channels. FIG. 2B shows a time-frequency diagram 90 of a set of Wi-Fi sub-channels (only a subset shown) used in a channel of the WLANs 20, 30 of FIG. 1. The Wi-Fi sub-channels correspond to a set of Wi-Fi sub-carriers W-SC$_{1-N}$, typically 52 (N=52) in a 20 MHz channel, which are spaced apart by 312.5 kHz. Because of the larger sub-channel spacing, Wi-Fi symbols 84 are generally much shorter than LTE symbols 82. In the example of FIG. 2A, each Wi-Fi symbol 82 is 3.2 ρs long and is preceded by a 0.8 ρs cyclic prefix (CP) (not shown) for a total duration of 4 ρs.

Understanding the differences in, for example the number of carriers, the carrier spacing and the symbol time duration, it is possible for one base OFDM system (denoted as OFDM1) configured to transmit information using its defined set of (base) subcarriers to also be configured to encode subcarrier or symbol information of another OFDM system (denoted as OFDM2) in a way that such information can be decoded by receivers configured in accordance with that other system. In some implementations, the subcarrier spacing $\Delta f_1$, symbol duration $T_1 = k_1/\Delta f_1$ and system bandwidth $BW_1$ of the OFDM1 system and those of the OFDM2 system ($\Delta f_2$, $T_2 = k_2/\Delta f_2$, and $BW_2$) are such that:

$$\Delta f_1 < \Delta f_2 \tag{1}$$

$$T_1 > T_2 \tag{2}$$

$$BW_1 = (M*\Delta f_1) \geq BW_2 = (N*\Delta f_2) \tag{3}$$

where $k_1$ and $k_2$ are integer values, which are typically set to 1,

M is the number of OFDM1 subcarriers, and

N is the number of OFDM2 subcarriers.

In other implementations, an OFDM1 transmitter is configured to generate and transmit subcarrier and/or symbol information of any OFDM2 system that uses a subcarrier spacing larger (or substantially larger, e.g. by a factor of 10 or 20) than the OFDM1 subcarrier spacing. Stated another way, the OFDM1 transmitter is configured to generate and transmit subcarrier and/or symbol information of any OFDM2 system that uses a symbol duration smaller (or substantially smaller, e.g. by a factor of 10 or 20) than the OFDM1 symbol duration. In typical LTE and Wi-Fi systems for example, the LTE subcarrier spacing is smaller than the Wi-Fi subcarrier spacing (which means the Wi-Fi symbol duration is smaller than the LTE symbol duration). In yet other implementations, the OFDM1 transmitter is configured to generate and transmit subcarrier and/or symbol information of any OFDM2 system that has a system bandwidth that is greater or equal to the OFDM1 system bandwidth. However, in other implementations, this may not be necessary. For example, while LTE can operate at multiple different system bandwidths (e.g. 5, 10, 15, 20 MHz) some of which may be smaller than the Wi-Fi system bandwidth, an LTE transmitter can generally be configured to utilize the available spectrum in a way that is sufficient for Wi-Fi transmissions (see for example the implementations described below in relation to FIGS. 7A-B).

Generally, therefore, it is possible for an LTE transmitter to encode and transmit Wi-Fi information in a way that it can be recovered by a Wi-Fi receiver. In some implementations, in addition to being configured to generate and transmit Wi-Fi and LTE symbol information, the LTE transmitter may also be configured to generate subcarrier and/or symbol information of yet other OFDM technologies.

In other implementations, an LTE transmitter (e.g. the access node 60 of FIG. 1) can use LTE subcarriers L-SC$_{1-M}$ to generate 802.11 (e.g. Wi-Fi) subcarrier or symbol information that can be understood by Wi-Fi receivers, for example to reserve the channel for periodic LTE control transmissions (e.g. a Discovery Reference Signal (DRS) for License Assisted Access for Long Term Evolution (LAA-LTE or LAA)), to indicate a transmission time associated with an on-going and/or upcoming downlink or uplink LTE transmission or to create a carrier sense indication to cause Wi-Fi receivers and other radio technologies to consider the channel as busy. The embodiments described below are primarily in relation to the generation of Wi-Fi subcarriers/symbol information in an LTE transmitter. However, it is understood that the same approach is equally applicable to other OFDM technologies such as for example 802.15 technologies (e.g. ZigBee). Generally, the principles described herein are applicable to generating subcarriers or symbol information from one OFDM technology using another OFDM technology.

FIG. 3 illustrates a timing diagram 100 showing an example of a symbol transmission by an LTE transmitting node (e.g. the access node 60 in the LTE RAN 10 of FIG. 1), in accordance with the principles described herein. In this example, the access node 60 is configured to transmit Wi-Fi information, for example Wi-Fi header and/or packet data to indicate its current use of a (unlicensed) channel shared with devices in the WLANs 20, 30 and/or to reserve the channel for a certain amount of time (further details below). The Wi-Fi information is modulated by the access node 60 in the form of a set of one or more Wi-Fi symbols 110, 112, 114 (only three shown) and transmitted during the duration of one LTE symbol 102 (e.g. 66.7 ρs). In order to be properly decoded by devices in WLANs 20, 30, each Wi-Fi symbol 110, 112, 114 includes a respective CP 110a, 112a, 114a (e.g. 0.8 ρs) and has a symbol duration (e.g. 3.2 ρs) that conforms to the duration expected by devices in the WLANs 20, 30. In the example of FIG. 3, the number of Wi-Fi symbols 110, 112, 114 is designed to fit into one LTE symbol duration 102 (e.g. after an LTE symbol preamble or CP 102a) but in other implementations, the number of Wi-Fi symbols 110, 112, 114 is substantially less than one LTE symbol duration 102. In yet other implementations, the access node 60 uses up to sixteen Wi-Fi symbols 110, 112, 114 in a 66.7 ρs LTE symbol time duration. In yet other implementations, the access node 60 uses some of the Wi-Fi symbols 110, 112, 114 for Wi-Fi header data and the rest for Wi-Fi packet or frame data, the size of which depends on the Wi-Fi modulation rate used. In yet other implementations, the Wi-Fi symbols 110, 112, 114 are organized in multiple sets to span over multiple LTE symbol durations where each set is configured to fit in the duration of one LTE symbol. In yet other implementations, the first Wi-Fi symbol set is preceded by an LTE CP (e.g. CP 102a), but subsequent Wi-Fi symbol sets are transmitted without an LTE CP to ensure proper recovery by Wi-Fi receivers. The Wi-Fi symbols 110, 112, 114 shown in FIG. 3 represent one particular type of Wi-Fi symbols that can be used (e.g. for Wi-Fi data transmissions). However, it is important to note that depending on the implementation and the type of Wi-Fi transmission desired, the principles described herein also equally apply to other types of Wi-Fi symbols. For example, short and long Wi-Fi symbols such as those defined for Short Training Fields (STFs) and Long Training Fields (LTFs) could be used. Further, the Wi-Fi symbols may or may not be transmitted with a CP and may have time duration that is different from the time duration of the Wi-Fi symbols 110, 112, 114 (e.g. other 3.2 ρs). Other possibilities exist for the Wi-Fi symbols 110, 112, 114.

In some implementations, the Wi-Fi information contained in the Wi-Fi symbols 110, 112, 114 is to reserve the channel for the LTE transmission. In those implementations, the Wi-Fi information may be indicative of a transmission time, length, type associated with and/or a channel reservation time necessary for transmitting the Wi-Fi symbols 110, 112, 114, the LTE symbols 104 or a combination of both.

In some implementations, the access node 60 generates Wi-Fi symbols 110, 112, 114 to contain a Wi-Fi header or a Clear-To Send (CTS) packet such as a "CTS-to-Self" packet to reserve the channel with a "virtual carrier sense", enabling devices in the WLANs 20, 30 to receive this header/packet information down to −82 dBm or lower and refrain from transmitting until after the LTE transmission (e.g. the LTE symbols 104) has been sent. Moreover, in some implementations, by generating and transmitting both the Wi-Fi symbols 110, 112, 114 and the LTE transmission 104, the access node 60 can apply the same (LTE) processing functions such as filtering, PAR, digital pre-distortion, PSD management, RMS power control, etc., to the generation and transmission of both the Wi-Fi symbols 110, 112, 114 and the LTE transmission 104 which follows.

It is important to note that different Wi-Fi header and/or packet data may be used for different applications. Also, depending on the application, the Wi-Fi header and/or packet data transmission does not necessarily need to be preceded by or followed by an LTE transmission. For applications other than channel reservation for example, the Wi-Fi information can be transmitted as a stand-alone transmission. In one implementation, the access node 60 may also use Wi-Fi symbols 110, 112, 114 to send PROBE REQUEST packets to detect nearby Wi-Fi APs. In another implementation, the access node 60 uses the Wi-Fi symbols 110, 112, 114 to send disassociation or de-authentication packets to Wi-Fi Stations (clients) in an attempt to move them to the LTE RAN 10. In yet another implementation, the access node 60 uses the Wi-Fi symbols 110, 112, 114 to send (stand-alone) 802.11 beacons that may include one or more 3GPP or 802.11-related parameters to improve 3GPP and W-Fi co-existence (described below in greater detail). Other applications are possible. Generally, using the principles described herein, the access node 60 can use to Wi-Fi symbols 110, 112, 114 to send any type of Wi-Fi packets or frames including for example RTS or CTS packets, NULL packets, W-Fi sounding packets, LWA packets, beacons, Point Coordination Function (PCF) beacons, H Hybrid Coordination Function (HCF) beacons for a variety of different applications.

Turning now to FIGS. 4A-B, two different W-Fi transmissions 124, 134 that the access node 60 can use to reserve the channel for a subsequent LTE symbol transmission are shown. The LTE symbol transmission is shown as a series of Transmission Time Intervals (TTIs) 126a-d and 138a-d which, in this example, are 1 millisecond (msec) each in duration. Each of the W-Fi transmissions 124, 134 has a duration that fits within one LTE symbol but as noted above, the W-Fi transmissions 124, 138 may span multiple LTE symbols in other implementations. In the example of FIG. 4A, a W-Fi CTS-to-Self packet 124 is used to reserve the channel for TTIs 126a-d (only four shown) while in the example of FIG. 4B, a W-Fi header 134 is used for TTIs 138a-d.

According to principles of the present disclosure, each of the CTS-To-Self packet 124 and header 134 contains a channel reservation indication indicating an amount of time during which the access node 60 intends to use the channel. In some implementations, the reservation indication prevents listening devices (e.g. devices in the WLANs 20, 30 that have received and demodulated the indication) to perform any transmission until the reservation time has expired.

As described below in more detail, there are many possibilities for the channel reservation indication. In the example of FIG. 4A, the channel reservation indication is a Network Allocation Vector (NAV) indication in the CTS- To-Self packet 124. In some implementations, the NAV indication is a NAV timer value defining how long the channel will be reserved. In some implementations, the NAV timer value is indicative of a time required to transmit the CTS packet, the LTE TTIs 126*a-d* (e.g. NAV reservation time 128) and/or a combination thereof. In other implementations, the NAV timer value is an end time of the LTE TTI 126*a-d* transmission. The devices that receive and demodulate the CTS packet will refrain from transmitting until a timer set to the NAV timer value expires. In yet other implementations, the channel reservation indication is included in a different field of the CTS-to-Self packet 124. Generally, any packet data or any field of a Wi-Fi packet may be used for the channel reservation indication. In other implementations, the channel reservation indication is a value indicative of any one of a transmission length, time or type or a channel reservation time associated with the CTS-to-Self packet 124, the LTE symbols and/or both. Other possibilities exist for the channel reservation indication.

In the example of FIG. 4B, the channel reservation indication is a length reservation indication or other control data in the Wi-Fi header 134 representing an octet count associated with the LTE TTIs 138*a-d*. In other implementations, the length reservation indication (or control data) is a time duration required for transmitting the Wi-Fi header 134, the LTE TTIs 138*a-d* (e.g. length reservation time 140) and/or a combination thereof. In yet other implementations, the length reservation indication is an end time of the LTE TTI 138*a-d* transmission. In yet other implementations, the Wi-Fi header 134 and the LTE TTIs 138*a-d* may be viewed as a combined packet transmission 130 where the LTE TTIs 138*a-d* (and possibly other information) form the packet data payload with a length that corresponds to the length reservation indication. In those implementations, Wi-Fi receivers (e.g. devices in WLANs 20, 30) recover the Wi-Fi header 134 and refrain from using the channel until the packet data payload (e.g. the LTE TTIs 138*a-d*) has been completely transmitted while LTE receivers (e.g. the access node 60) are configured to receive and demodulate only the LTE TTIs 138*a-d* (the Wi-Fi header may be unrecoverable).

Depending on the implementation and the nature of the channel reservation indication used, the Wi-Fi and LTE transmissions are either contiguous or non-contiguous transmissions. For example, the access node 60 may, in some implementations, initiate the LTE transmission immediately after completing the Wi-Fi transmission or alternatively, wait after a certain delay (e.g. as in FIG. 4A). In other implementations such as the example shown in FIG. 4B, the access node 60 implements an LTE frame alignment 136 to bridge the gap between the (asynchronous) W-Fi transmission and the LTE transmission which may need to be synchronized to a synchronization source (e.g. a primary cell). Alternatively, the access node may transmit noise (or some RF power) during that delay to maintain the transmit power envelope and prevent Wi-Fi devices to assume the channel is free.

In some implementations, the access node 60 may continue to use the channel beyond the time duration or end time indicated by the channel reservation indication. For example, the access node 60 may also be configured for an additional transmission following TTIs 126*a-d* or TTIs 138*a-d*. The additional transmission may be an additional set of LTE TTIs or some other transmission (e.g. a Wi-Fi transmission) and is contiguous with the preceding TTIs 126*a-d*, 138*a-d* to prevent Wi-Fi devices from transmitting during the additional transmission. In those implementations, the channel reservation indication indicates how long the channel is reserved for the LTE TTIs 126*a-d*, 138*a-d* but not for the additional transmission.

In some implementations, the access node 60 performs a channel availability check using a contention-based method, for example Listen-Before-Talk (LBT) 122, 132 to determine whether another transmission is in progress in the channel or band used. This determination may be based on the detection of a carrier wave, signal or energy in the channel or band of interest (e.g. with a −62 dBm threshold). If during that time, a carrier or energy is detected in the band or channel of interest (in another fully or partially overlapping channel or band), the access node 60 waits for the transmission in progress to finish before initiating its own transmission. Alternatively, if no carrier or energy is detected, the access node 60 (immediately) transmits either the CTS-To-Self packet 124 or header information 134 and completes the subsequent LTE transmission (TTIs 126*a-d* or 138*a-d*).

Figure 5:
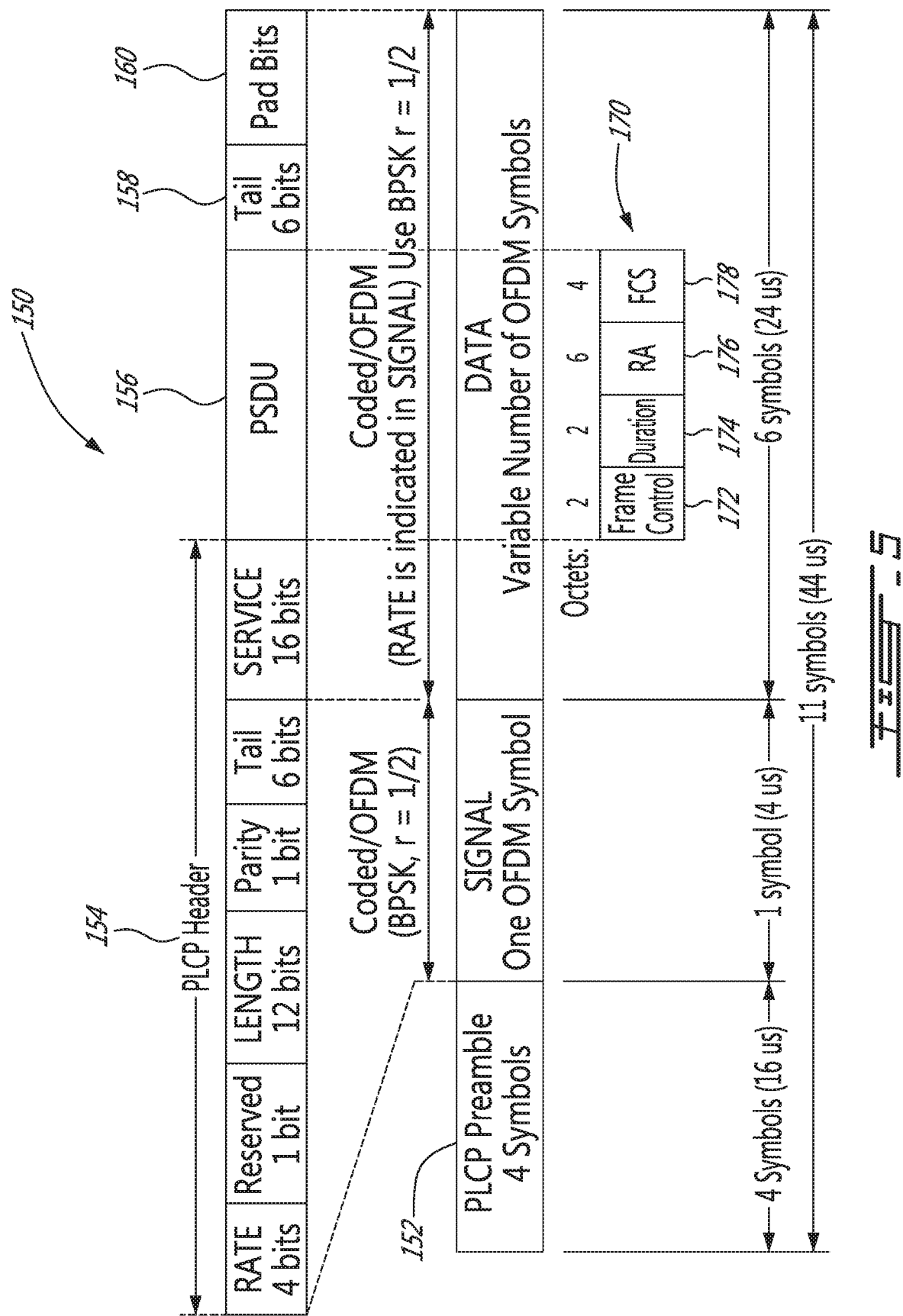
FIG. 5 illustrates a format example for the CTS-To-Self packet of FIG. 4A in accordance with the principles described herein.

FIG. 5 illustrates an example of a Physical Layer Convergence Protocol (PLCP) Protocol Data Unit (PPDU) 150 that includes the CTS-To-Self packet 124 shown in FIG. 4A in accordance with the principles described herein. In this example, the CTS-to-Self packet, denoted as 170, is included in a PLCP Service Data Unit field 156 of the PPDU 150 which also includes a preamble 152 and a header 154 (collectively herein referred to as header) as well as tail and pad fields 158, 160. The CTS frame 170 includes a frame control field 172 that specifies the type of frame 170 (in this case a CTS-To-Self frame), a duration field 174 to specify a NAV timer value, a Receiver Address (RA) field 176 which is set to the Transmitter Address for a CTS-To-Self packet and a Frame Check Sequence (FCS) field 178 which specifies an error-correcting code for the CTS packet 170. In some implementations, eleven Wi-Fi symbols, each 4 ρs in duration, are required to transmit the CTS-To-Self packet 170 (as included in a PPDU 150) for a total transmission length of 44 ρs which fits into a 71.4 or 83 μsec LTE symbol.

Figure 6A:
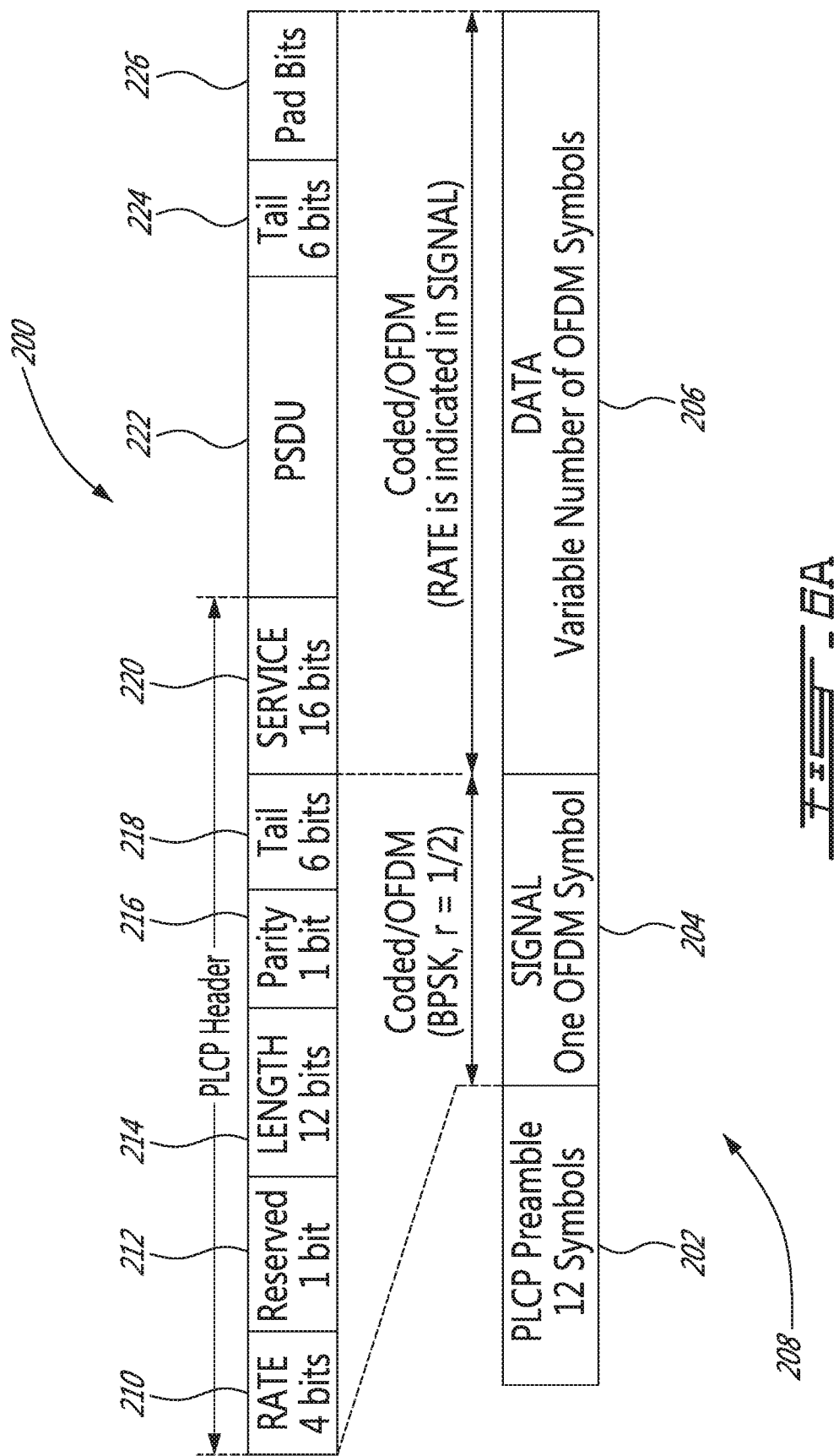

FIG. 6A illustrates an example of a format for the Wi-Fi header 134 shown in FIG. 4B in accordance with the principles described herein. In this example, the Wi-Fi header 134 is a PLCP header 208 which includes a preamble 202 and a Signal field (SIG) 204 (collectively herein referred to as header data) contains a channel reservation indication (in the SIG 204) to reserve the channel for a certain period of time. The channel reservation indication is set in a length field 214 as an octet count which is indicative of the amount of data to follow in a data field 206. Together with a modulation rate for the data specified in rate field 210, the channel reservation indication in the length field 214 is indicative of the time required to transmit or an end transmission time for the data (e.g. up to 5 msec). The data contained in the data field 206 and the PLCP header 208 are shown as a combined transmission 200 where the data field length corresponds to the channel reservation indication contained in the SIG 204. However, the PLCP header 208 and the data field 206 may be sent as two separate transmissions (e.g. non-contiguous transmissions). In some implementations, the data includes LTE symbols (e.g. LTE TTIs 138*a-d* in FIG. 4B) but in other examples, the data may include additional or other information such as Wi-Fi symbols and/or a random transmission (e.g. noise 136). Other possibilities exist for the data in the data field 206. As noted above, the data in the data field 206 may also be followed by an additional transmission, such as an additional set of LTE TTIs or some other transmission (e.g. a Wi-Fi transmission).

In addition to the length field 214, the SIG 204 also includes the rate field 210 that specifies a modulation rate for the data in the data field 206, a reserved field 212, a parity field 216, a tail field 218 and a service field 220. In some implementations, the tail field 218 is set to a value indicative of a type of symbols or OFDM associated with the data in the data field 206 (e.g. in this case an LTE type). In other implementations, the tail field 218 is set of a first value when LTE symbols are present in the data field 206 and a different value when non-LTE symbols (e.g. Wi-Fi symbols) are included). Advantageously, in some implementations, setting the tail field 218 to a value indicative of the presence of LTE symbols in the data field 206 notifies listening devices (devices configured to receive and demodulate the PLOP header 208) that the data field 206 contains symbols of a different OFDM type (e.g. LTE symbols). In other implementations, this indication is an OFDM indication and may be included in another field (other than the tail field 218 or the SIG 204) at the same or different layer. For example, in yet other implementations, the OFDM indication is included in a MAC layer protocol field, such as the Frame Control Field which contains bits (e.g. b0 and b1) normally used to specify an associated protocol. This OFDM indication may represent an OFDM type or mode or an OFDM parameter associated with the data in the data field 206 such as symbol duration, CP duration, number of subcarriers, subcarrier spacing, subcarrier modulation formats, subcarrier frequencies, etc.

FIG. 6B shows other format examples for the Wi-Fi header 134 shown in FIG. 4B that can be used by the access node 60 to reserve a channel according to the principles described herein. For a legacy mode, transmission 240 includes a Legacy (L) Short Training Field (STF) 242, a Legacy (L) Long Training Field (LTF) field 244, and a Legacy (L)-SIG 246 that contains a channel reservation indication to reserve the channel for the data (e.g. LTE symbols or Wi-Fi symbols) to be transmitted in data field 248. For a mixed mode, transmission 250 includes an L-STF 252, an L-LTF 254, an L-SIG 256, a High Throughput (HT)-SIG field 258, an HT-STF 260, an HT-LTF 262 and a data field 264. Either the L-SIG 246 or the HT-SIG 258 is configured to contain a channel reservation indication to reserve the channel for the data to be transmitted in the data field 264. For a green field mode, transmission 270 includes an L-STF 272, an HT SIG 274, an HT-STF 276, an HT-LTF 278 and a data field 280. The HT-SIG 274 is configured to contain a channel reservation indication to reserve the channel for the data to be transmitted in the data field 280. In some implementations, the data in the data field 248, 264, 280 includes LTE symbols (e.g. LTE TTIs 138*a-d* in FIG. 4B) but in other examples, the data may include additional or other information such as W-Fi symbols and/or a random transmission (e.g. noise 136). Other possibilities exist for the data in the data field 248, 264, 280. As noted above, the data in the data field 248, 264, 280 may also be followed by an additional transmission, such as an additional set of LTE TTIs or some other transmission (e.g. a Wi-Fi transmission).

Although the examples provided above show that the channel reservation indication used is a length value included in a SIG field, other possibilities exist. Generally, any control data or field in the Wi-Fi header 134 can be used for the channel reservation indication. In other implementations, the channel reservation indication is a value indicative of any one of a transmission length, time or type or a channel reservation time associated with the Wi-Fi header 134, the data in the data field (e.g. LTE symbols) and/or both. Other possibilities exist for the channel reservation indication.

In yet another channel reservation implementation, a Wi-Fi header or preamble transmission (such as the Wi-Fi header 134 shown in FIG. 4B) spanning over one entire LTE symbol duration (e.g. 66.7 ρs) may be used to reserve a channel. In one example, a series of 3 Wi-Fi headers, each including a set of LTF, STF and SIG fields plus an additional STF field is used. The Wi-Fi headers may be preceded by an LTE symbol preamble or CP (e.g. CP 102*a* of FIG. 3). Note that other combinations of Wi-Fi header information may be used for the transmission, including for example:
repetitions of STF fields
repetitions of LTF fields
any repeated combination of one STF and two LTF fields
any repeated combination of two STF and one LTF fields
any permutation of 3 STF, 3LF and 3 SIG fields, and
permutations of STF, LTF, SIG and other W-Fi header fields.

In some implementations, the W-Fi header transmission described above is configured to fit within one LTE symbol time. However, depending on the application, the W-Fi header transmission may span multiple LTE symbols. Also, the W-Fi header transmission does not necessarily need to be preceded by or followed by an LTE transmission. For applications other than channel reservation for example, it may be transmitted as a stand-alone transmission.

For implementations with delay or time-sensitive LTE transmissions or transmissions that must occur within a certain time window and/or with a certain periodicity, an LTE transmitter (e.g. the access node 60) can be configured to use LTE subcarriers as described herein to transmit 802.11 (e.g. W-Fi) beacon information as a means to reserve the channel.

The use of beacons can be useful in implementations where it is desirable to broadcast the presence of the LTE transmitter to other W-Fi radios by including in the beacons one or more 802.11-related parameters defined for or associated with the LTE transmitter. Examples of such 802.11 parameters include a Service Set Identifier (SSID), a Basis SSID (BSSID), a Medium Access Control (MAC) address (for the LTE transmitter or an associated AP to which the LTE transmitter is connected), or a beacon period, a (minimum/maximum/average) transmit duty cycle, a (minimum/maximum/average) receive duty cycle, a combined (minimum/maximum/average) transmit/receive duty cycle, a (minimum/maximum/average) contention free period, a number of active UE sessions, a number of associated clients, a DRS periodicity, an LAA channel number, a channel number for an unlicensed channel, a channel bandwidth of an LAA control channel, and a channel bandwidth of at least one unlicensed aggregated channel. In some of those implementations, the 802.11-related parameters advantageously do not need to be sent over licensed frequencies and instead can be read locally by commercially available Wi-Fi deployment or debug tools. In addition, support crews can use the information broadcasted to support and maintain the LTE infrastructure without having to use ports on the LTE transmitter.

In yet other implementations, various LTE or 3GPP-related parameters defined for or associated with the LTE transmitter may also be included in the beacons as an alternative or in addition to 802.11-related parameters. Examples includes a Cell Identifier (CID), a transmit power, a received interference power, a thermal noise power, a phase/frequency synchronization status, a Transport Network (TN) bandwidth, a TN latency, a TN jitter, and a TN availability. In some of those implementations, the transmit power is a downlink Reference Signal (RS) transmit power as measured based on UE measurements or metrics (e.g. a Reference Signal Received Power (RSRP), Reference Signal Received Quality (RSRQ), Reference Signal-SINR (RS-SINR)) as defined in 3GPP specifications (e.g. TS 36.211, TS 36.214).

The received interference power may be indicative of the uplink received interference power, including thermal noise, within one Physical Resource Block's bandwidth of $N_{sc}$ resource elements as defined in TS 36.211. Alternatively, the received interference power parameter may contain multiple received interference power measurements of one or more PRBs as defined in TS 36.211, typically referenced to a receive (RX) antenna connector. A thermal noise power parameter defined in the UL uplink system bandwidth consisting of NRB resource blocks as defined in TS 36.211 and TS 26.214, may optionally be reported together with received interference power measurements.

In some of those implementations, the LTE-related parameters, when properly received, can enable near-by Wi-Fi devices and networks and/or RRM algorithms to dynamically adjust their Wi-Fi channel usage (e.g. channel selection, transmit power, etc.) thereby enhancing 3GPP and Wi-Fi co-existence.

In addition, the beacon may also include alarms and/or thresholds associated with any of the 802.11 or LTE-related parameters. For example, the beacon may include a "TN Latency Warning: Packet Delays in Excess of 100 ms Detected" IE or "TN Latency Alarm: Excessive Voice Delays and/or Packet Losses" IE. Other alarm and/or thresholds can also be used.

According to principles of the present disclosure, there are many possibilities for transmitting 802.11 and LTE-related parameters in Wi-Fi transmissions. In one implementation, the parameters are included in current or new Information Elements (IEs) in the 802.11 beacon frame body (see FIGS. 7, 8). Alternatively, the parameters may be included in Information Elements specific to a vendor (a Vendor Specific Element ID). In another alternative, the parameters are included in IEs or fields of any of the other Wi-Fi transmission examples described above (e.g. Wi-Fi transmissions 124, 134).

In yet other implementations, it is even possible for a conventional Wi-Fi device (e.g. a transmitter configured to use Wi-Fi subcarriers) which is associated with or integrated into an LTE transmitter, to transmit 802.11 beacons that include any or a combination of the LTE-related parameters described above. In some of those implementations, the LTE-related parameters, when properly received, can enable other near-by Wi-Fi devices and/or networks and/or RRM algorithms to dynamically adjust their Wi-Fi channel usage as noted above to enhance 3GPP and Wi-Fi co-existence.

In other implementations, by transmitting beacons, the LTE transmitter can gain prioritized access to the channel because it can apply the same operational settings that govern the transmission of 802.11 beacons generated by a Wi-Fi transmitter.

Under 802.11 rules, beacons are sent at the highest priority, often with a priority higher than voice packets. For 3GPP LTE wireless systems to share the wireless media with Wi-Fi devices, similar priority rules should be applied at least for time-sensitive LTE data (e.g. control data) sent in over the air (OTA) transmissions. As is well-known, 802.11 applies different QoS levels for different classes of OTA traffic. QoS is achieved by modifying parameters listed in Table 8-105 of the 802.11ac specification reproduced below, that affect how the wireless medium or channel is accessed. Next to beacons, voice packets have the highest priority, and are transmitted using the shortest Contention Window (defined by CWmin and CWmax), and the smallest Arbitration Inter-Frame Space Number (AIFSN) i.e. set to 2.

TABLE 8-105

| ACI | AC | Description | CWmin | CWmax | AIFSN |
|---|---|---|---|---|---|
| 00 | AC_BE | Best effort | aCWmin | aCWmax | 9 |
| 01 | AC_BK | Background | aCWmin | aCWmax | 6 |
| 10 | AC_VI | Video | (aCWmin + 1)/ 2 − 1 | aCWmin | 3 |
| 11 | AC_VO | Voice | (aCWmin + 1)/ 4 − 1 | (aCWmin + 1)/2 − 1 | 2 |

Using these parameters, Wi-Fi transmitters are able to wait less time before sending a beacon or voice packet. Video packets are sent with a longer CWmin, and with a larger AIFSN value. The majority of Wi-Fi OTA traffic is sent with Background or Best Effort QoS. As a result, the key parameters of CWmin and CWmax, as well as AIFSN are adjusted to ensure that the multitude of 802.11 Wi-Fi devices will share the wireless media, even in the presence of many devices, with very high traffic levels.

An LTE transmitter (e.g. the access node 60) can therefore exploit the priority rules described above and use 802.11 beacon information as a means to gain prioritized access to reserve the channel. Examples of suitable LTE transmissions that would benefit from prioritized channel access include LTE control data or signals (e.g. PDCCH), and/or synchronization or reference signals such as the Discovery Reference Signal (DRS) for LAA-LTE). For DRS transmissions, the LTE transmitter can employ the correct parameters such as CWmin, CWmax, and AIFSN to gain prioritized channel access for transmitting 802.11 Wi-Fi beacons (using its LTE subcarriers). Use of a beacon for channel reservation effectively "protects" the DRS and ensures that the DRS transmissions take priority over other types of LTE and/or Wi-Fi traffic.

Moreover, in some implementations, the periodicity of DRS transmissions (every 40, 80 or 160 msec) being on the same order of magnitude as Wi-Fi beacons which are typically sent at 100 msec intervals may further improve the ability of Wi-Fi and 3GPP LTE radios to co-exist. Advantageously in those implementations, the relative rate of DRS transmissions will not "beat" with "Wi-Fi" beacons (transmitted by Wi-Fi radios), except every 10.24 seconds, when the transmissions may align. This. In addition, assuming a 12-symbol DRS transmission (further details below), where the final 2-LTE symbols may not be sent, if the Wi-Fi beacon is sent as a single 71ρs LTE symbol immediately before a DRS transmission, then the total beacon air-time (including the DRS transmission time) would be 928 ρs, representing only a 0.58% air-time duty cycle if the beacons are transmitted every 160 milliseconds.

FIG. 7 shows an example of a Wi-Fi beacon frame transmission 920 that an LTE transmitter (e.g. the access node 60) can generate and transmit to reserve the channel for a DRS transmission 910. Although limited to a DRS, it is understood that the principles described therein are also applicable to other types of control LTE signals (e.g. PDCCH) as well as generally, any LTE signal or information that is delay-sensitive or time-sensitive and/or that must be sent within a certain time window and/or with a certain periodicity (e.g. uplink/downlink transmissions).

In the example of FIG. 7, the beacon frame transmission 920 is a PPDU that includes a beacon frame 906 (shown as a MAC frame) as well as a (PHYsical layer) PLOP preamble 902, and a (PHY) PLOP header 904. Some of the more notable fields in the beacon frame 906 include a frame control field 912 which specifies the type of frame or packet, a duration field 914 to specify a timer or duration value (e.g. a NAV value), one or more address fields 916 which is set to the Transmitter Address for a beacon frame, a frame body field 917 which contains various 802.11 and LTE-related parameters, and an FCS field 918 which specifies an error-correcting code for the beacon frame 906. In the beacon frame 906, the frame control field 912 includes "Type" and "Subtype" fields (not shown) which, according to 802.11 specifications define many different types of (MAC layer) packet transmissions. For beacons, the Type value is set to "00" to indicate a "management" type and the Subtype value is set to "1000" to specify a beacon subtype. The frame body field 917 contains various 802.11-related parameters such as timestamp, beacon interval and/or capability information and may in addition include additional 802.11 or LTE-related parameters defined for or associated with the LTE transmitter as described above. The duration field 914 contains a 2-byte NAV value which acts as a channel reservation indication and can provide up to 32767 µsec (or 32.767 msec) of channel reservation time for subsequent LTE transmissions. The duration field is set such that it reserves the channel for a period of time that is sufficiently long for the LTE transmitter to transmit the DRS 910. In some implementations, eleven Wi-Fi symbols, each 4 ρs in duration, are required to transmit the beacon frame 906 (as included in a PPDU) for a total transmission length of 44 ρs which fits into a 71.4 or 83 µsec LTE symbol. However, in other implementations, it is possible for set the duration field value to a larger value to reserve the channel for a DRS and/or subsequent downlink or uplink transmissions.

In the example of FIG. 7, the beacon frame transmission 906 is followed by an LTE or 3GPP frame alignment period 908. As it well-known, LTE transmissions are typically synchronous, and follow TTI (e.g. 1 msec) boundaries. Therefore, transmission of the LTE frame alignment period 908 makes the channel appear as a single Wi-Fi packet transmission 900 so that other Wi-Fi devices will not assess the channel as being free. However, in some implementations, a random signal may be transmitted during that period or alternatively, no signal energy is transmitted at all. In some implementations, the duration of the frame alignment period depends on how long in advance the channel was assessed by the LTE transmitter as being free (as per a CCA procedure) before the DRS transmission is available and must be transmitted.

The DRS transmission is shown to occupy one LTE TTI but as noted before, other types of LTE transmissions could span multiple TTIs (as shown in FIGS. 4A-4B). The DRS which is employed for providing Radio Resource Management (RRM) functionality for LAA operation, was introduced in 3GPP (Release 12) to support secondary cell ("SCell") activation and deactivation. SCells that are not activated for any UEs may generally be turned off except for periodic DRS transmissions. A conventional DRS transmission is allocated predetermined or defined Resource Elements (RE) across the system bandwidth (only a span of LTE 12 subcarriers shown) and typically includes any combination of the following signals:

Primary Synchronization/Secondary Synchronization Signals (PSS/SSS)
Cell Specific Reference Symbol (CRS) signals,
Channel-State Information Reference Signals (CSI-RS)
The information carried by the DRS typically contains cell and/or PLMN identification as well as other control information that may be required for proper LAA operation e.g. to enable UEs to identify a detected cell and/or the operator of the cell. The DRS is transmitted in DRS occasions that may have a periodicity of 40, 80 or 160 msec. When LBT is applied to DRS transmissions, there will be some instances where the DRS cannot be transmitted periodically as it may in licensed spectrum. According to 3GPP standards, the DRS cannot exceed 1 msec in duration (i.e. 1 sub-frame or TTI) but is allowed to move within a Discovery Measurement Timing Configuration (DMTC) window of six sub-frames (or 6 msec) within which UEs can attempt to detect and measure DRS transmissions of serving and adjacent LAA cells. As shown in FIG. 7, a typical DRS transmission is defined to include CRS signals in symbols 0, 1 and 4 of slots 0 and 1 (using every $3^{rd}$ RE), PSS/SSS signals in symbols 5/6 of slot 0 (using all REs), and Non-Zero Power (NZP)—CSI-RS signals in symbols 2, 3 of slot 1 (using every 12th RE). All other REs may be used for CSI-RS signals (ZP or NZP), and/or control (e.g. PDCCH) or user (PDSCH) transmissions such as key information about the LTE transmitter, or possibly voice or video packet data.

FIG. 8 shows another example where the Wi-Fi beacon frame transmission 920 is instead sent as a Hybrid Coordination Function (HCF) beacon (e.g. as defined by appropriate Type and Subtype field values) and in which the duration field 914 is set to define a Contention Free Period (CFP) during which the DRS 910 can be transmitted but also to accommodate various additional downlink or uplink transmissions. In the example of FIG. 8, the duration field 914 is set with a value sufficiently large to reserve the channel for a periodic DRS transmission as well as a subsequent downlink transmission 922 (to a UE) and/or an uplink transmission 924 (from the UE). However, generally, the use of a CFP can apply in other scenarios. For example, it can be used to protect uplink and/or downlink data transmissions or it can be used to protect other types of periodic or time-sensitive uplink/downlink transmissions. Since it typically manages the scheduling of LTE data, an LTE transmitter (e.g. the access node 60) can be configured to schedule a CFP for UE devices which do not support to be able to make LTE transmissions without other Wi-Fi devices causing collisions. The operation of the CFP is explained in further detail in FIG. 9-22 of IEEE 802.11-2012, "IEEE Standard for Information technology—Telecommunications and information exchange between systems—Local and metropolitan area networks—Specific requirements—Part 11: WLAN MAC and PHY specifications" dated Mar. 29, 2012 and hereby incorporated by reference in its entirety.

According to principles of the present disclosure, there are many different ways in which an LTE transmitter (e.g. the access node 60) can be configured to use LTE subcarriers as described herein to generate and/or transmit 802.11 (e.g. Wi-Fi) beacon information to reserve the channel for a subsequent LTE transmission. In some implementations, and as will be explained below in further detail, the LTE subcarriers are used to generate LTE signals carrying either LTE or Wi-Fi information. specifically, the LTE subcarriers are used to generate a first LTE signal containing LTE data (e.g. the DRS 910) and a second LTE signal containing Wi-Fi beacon information which conventionally would be generated and transmitted using Wi-Fi subcarriers. Once generated, the LTE transmitter first transmits the second LTE signal containing the beacon information to reserve the channel and subsequently transmits the first LTE signal. As it can be seen, the LTE transmitter can generate and/or transmit the first and second LTE signals because they both use LTE subcarriers. In some implementations, the first LTE signal is generated by mapping a predetermined LTE signal (e.g. a DRS 910) to the LTE subcarriers and the second LTE signal is generated by mapping a predetermined Wi-Fi signal (e.g. the beacon frame 906 (or beacon frame transmission 920 of FIG. 7) also to the LTE subcarriers.

There are many different ways for the LTE transmitter (e.g. the access node 60) to obtain a predetermined Wi-Fi signal (e.g. the beacon frame 906) and a predetermined LTE signal (e.g. a DRS 910). In one example, the LTE transmitter is configured to obtain the predetermined Wi-Fi signal in the form of a dynamically generated (i.e. generated when needed) or a predetermined time-domain signal or vector of M samples (e.g. a Common Public Radio Interface (CPRI) I/Q vector) that spans over a portion or an entire LTE symbol duration. In another implementation, the LTE transmitter is configured to obtain the predetermined Wi-Fi signal in the form of a dynamically generated or a predetermined frequency-domain vector of M LTE subcarrier modulation values for one LTE symbol. These M subcarrier modulation values may be QAM constellations, or subcarriers I/Q values. In some implementations, when the M subcarrier modulation vector is applied in the LTE transmitter to an M-point Inverse Fast Fourier Transform (IFFT), the resulting Wi-Fi transmission generated can be recovered at Wi-Fi receivers by an N-point FFT. In some implementations, the Wi-Fi transmission may also be recovered by other LTE receivers since the transmission would align with LTE subcarrier constellations.

There are many different configurations that can be used in an LTE transmitter to generate and transmit both LTE and Wi-Fi information using LTE subcarriers. In one example, the LTE transmitter configuration may include two separate and independent physical layers (LTE and Wi-Fi), with different ASIC components and/or circuitry that reflect differences in for example, the symbol durations, cyclic prefix durations, number of subcarriers, subcarrier spacing, subcarrier modulation formats, subcarrier frequencies, or any one of numerous MAC layer differences, but it does not preclude that a common ASIC or other hardware circuitry can be configured to support both OFDM technologies. However, in other implementations, it is possible to integrate both OFDM technologies into the same device or set of components and configure these components to operate either in an LTE or W-Fi mode. The transmitter configuration examples provided below apply to equally to implementations with dedicated circuitry or common to all OFDM technologies supported (and operable in different modes).

Turning now to FIGS. 8A and 8B, there is shown two different block diagram examples of an OFDM transmitter 300, 350 of a first (or base) OFDM technology, denoted as OFDM1 (e.g. a 3GPP or LTE technology), which, in addition to being configured to use M base subcarriers for OFDM1 transmissions, is also configured to transmit subcarrier or symbol information of another OFDM technology, denoted as OFDM2 (e.g. a W-Fi technology), using the M subcarriers. Generally, the OFDM1 transmitters 300, 350 operate in a similar fashion but as will be explained below in greater detail, implementations of the OFDM1 transmitter 300 use time-domain interpolation to generate the OFDM2 information (e.g. using a Time-Domain (TD) Interpolator 314) while implementations of the OFDM1 transmitter 350 use frequency-domain interpolation instead (e.g. using a Frequency-Domain Interpolator 364).

In some implementations, the OFDM1 transmitter 300, 350 is configured to generate OFDM1 signals that carry OFDM1 or OFDM2 information and transmit the signals generated in sequence where, for example a second OFDM1 signal carrying OFDM2 information is transmitted to reserve the channel for a first OFDM1 signal carrying OFDM1 information transmitted subsequently. In some implementations, the first OFDM1 signal may be generated by mapping a first predetermined OFDM1 signal (e.g. DRS) to the available OFDM1 subcarriers and while the second OFDM1 signal may be generated by mapping a second predetermined OFDM2 signal (e.g. a beacon frame) to the OFDM1 subcarriers. The OFDM1 transmitter 300, 350 may use the second OFDM1 signal to encode various types of OFDM2 related information for various purposes, including for example to reserve a channel for a certain duration, to indicate a transmission time associated with the OFDM2 and/or subsequent OFDM1 transmission (e.g. the first OFDM1 signal) or to create a carrier sense indication, for example, to cause OFDM2 receivers to consider the channel as busy. In some implementations, the second OFDM2 signal includes a W-Fi beacon and the first OFDM1 signal includes a DRS, and the W-Fi beacon in the second OFDM1 signal is indicative of a transmission length, a transmission time, a transmission type, a channel reservation time and a contention-free period associated with the DRS, and at least one of a subsequent downlink or uplink LTE transmission. It is important to note that the first and second OFDM1 signal transmissions may be contiguous or non-contiguous.

The OFDM1 transmitter 300 has an OFDM1 transmission chain 302, an OFDM1 Inverse Fast Fourier Transform (IFFT) unit 304 and an OFDM1 RF unit 306 (e.g. DAC, mixer, and PA) which, in combination, are configured to generate and transmit a first OFDM1 signal 320 via one or more antennas 307. In some implementations, the OFDM1 transmission chain 302 generates (i.e converts) a serial OFDM1 symbol stream of Binary Phase Shift Keying (BPSK) or Quadrature Amplitude Modulation (QAM) data into M parallel streams. The OFDM1 transmission chain produces the first OFDM1 signal 320 (e.g. based on a predetermined OFDM1 signal) which, after conversion into the time domain in the IFFT unit 304, is transmitted via the RF unit 306 and antenna 307. In some implementations, the OFDM1 transmission chain output 320 is the predetermined OFDM1 signal and the OFDM1 transmitter 300 is configured to map the predetermined OFDM1 signal in the IFFT unit 304 to the M OFDM1 subcarriers to generate the first OFDM1 signal (denoted as 324).

According to principles of the present disclosure, the OFDM1 transmitter 300 also includes circuitry that is configured to produce a second OFDM1 signal 322 to carry OFDM2 information for transmission via the antenna 307. In one implementation, the circuitry includes an OFDM2 signal generator 312 configured to generate an OFDM2 signal. The OFDM2 signal is a time-domain signal that contains predetermined or defined OFDM2 symbol information generated with, for example, N OFDM2 subcarriers. In that implementation, the circuitry further includes an OFDM2-OFDM1 Time-Domain (TD) interpolator 314 that interpolates in the time-domain the predetermined OFDM2 signal generated (further details below) to produce the second OFDM1 signal 322 that contains the OFDM2 information. In some implementations, the TD interpolator 314 is configured to map the predetermined OFDM2 signal to the M OFDM1 subcarriers to produce the second OFDM1 signal 322. The second OFDM1 signal 322, a frequency-domain signal denoted in FIG. 9A as FDS, is converted into the time domain in IFFT unit 304 via switch 308 and routed to the RF unit 306 for transmission via antenna 307.

However other possibilities exist. In another implementation, the circuitry includes an OFDM1 signal memory 316 where the FDS signal 322 is stored. When the OFDM1 transmitter 300 determines that OFDM2 information needs to be transmitted (e.g. for channel reservation), it generates the FDS dynamically (e.g. on the fly) using the signal generator 312 and TD interpolator 314 or simply reads the FDS signal from the signal memory 316 and routes it as the second OFDM1 signal 322 the IFFT and RF units 304, 306 via switch 308 for transmission via the antenna 307. In implementations where the FDS signal 322 is read from the signal memory 316, the circuitry may only include signal memory 316. In other implementations, the stored FDS signal 322 is a predetermined or defined vector of OFDM1 (frequency-domain) subcarrier modulation values (e.g. a vector with M values) that includes values representative of predetermined or defined OFDM2 information.

In one example, the following vector of non-zero LTE subcarrier modulation values can be used by an LTE transmitter to produce an STF using a group of 2048 subcarriers (M=2048, sequentially numbered from −1024 to 1024):

$$STF\_LTE\_SCs=[-499,-415,-332,-249,-165,-82,85, 168,252,335,418,502]$$

$$STF\_LTE\_SC\_Value=\sqrt{(13/6)}*[1+i,-1-i,1+i,-1-i,-1-i,1+i,-1-i,-1-i,1+i,1+i,1+i,1+i]$$

Each of the twelve LTE subcarriers identified above in the STF_LTE_SCs array by sequence number is set to a corresponding non-zero modulation value in the STF_LTE_SC_Value array. In this example, the twelve LTE subcarriers identified above are those that overlap with at least one W-Fi subcarrier (or a main lobe thereof) i.e. the Wi-Fi subcarrier(s) that normally are used to produce an STF. However, depending on the implementation, there may be more or less LTE subcarriers included in the STF_LTE_SCs array to produce the STF. In some of these implementations, all other LTE subcarriers (those not identified in the STF_LTE_SCs array) are set to a zero value (e.g. (0+0i)).

In another example, for an LTE transmitter configured to use 2048 subcarriers (M=2048), the following vector of LTE subcarrier modulation values can be used to produce an LTF:

$$LTF\_LTE\_SCs=[-540,-519,499,-478,-457,-436,-415,-394,-374,-353,-332,-311,-290,-269,-249,-228,-207,-186,-165,-144,-124,-103,-82,-61,-40,-19,22,43,64,85,106,127,147,168,189,210,231,252,272,293,314,335,356,377,397,418,439,460,481,502,522,543]$$

$$LTF\_LTE\_SC\_Value=[1,1,-1,-1,1,1,-1,1,-1,1,1,1,1,1,1,-1,-1,1,1,-1,1,1,1,1,1,1,1,-1,-1,1,1,1,-1,1,-1,1,-1,-1,-1,-1,-1,1,1,1,-1,-1,1,1,-1,1,-1,1,-1,1,1,1,1,1,1];$$

Each of the fifty-two LTE subcarriers identified above in the LTF_LTE_SCs array by sequence number is set to a corresponding non-zero modulation value in the LTF_LTE_SC_Value array. Again, the fifty-two LTE subcarriers identified above in this example are those that overlap with at least one Wi-Fi subcarrier (or a main lobe thereof) i.e. the Wi-Fi subcarrier(s) normally used to produce an LTF. Depending on the implementation, there may be more or less LTE subcarriers included in the LTF_LTE_SCs array. In some of these implementations, all other LTE subcarriers (those not identified in the LTF_LTE_SCs array) are set to a zero value (e.g. (0+0i)). Other possibilities exist for the LTE subcarrier modulation values.

In yet another implementation, the TD interpolator 314 instead produces a time-domain OFDM1 signal, TDS 326, to carry the OFDM2 information. In that implementation, when the OFDM1 transmitter 300 determines that the OFDM2 information needs to be transmitted, the TD interpolator 314 generates the TDS signal 326 carrying the OFDM2 information as the second OFDM1 signal 326 for transmission via the RF unit 306 and antenna 307. In a variation of that implementation, the TD interpolator 314 is configured to map the predetermined OFDM2 signal to the M OFDM1 subcarriers to produce the TDS signal 326 (i.e. the second OFDM1 signal). The OFDM1 transmitter 300 routes the TDS signal 326 into the OFDM1 RF unit 306 via a switch 310 directly from the TD interpolator 314 or via the signal memory 316. In implementations where the TDS signal 326 is read from the signal memory 316, the circuitry may only include signal memory 316. In other implementations, the stored TDS signal 326 is a predetermined or defined vector of OFDM1 (time-domain) samples (e.g. a vector with M samples) that is representative of predetermined or defined OFDM2 information.

In some implementations, the switch 308 (or 310) is part of a switching module (not shown) that is configured to determine when OFDM2 information needs to be transmitted and based on that determination, to route the FDS (or TDS) signal 322 (or 326) containing the OFDM2 information (e.g. the second predetermined OFDM2 signal) to the IFFT unit 304 (or OFDM1 RF 306) or route the OFDM1 transmission chain output (e.g. the first OFDM1 signal 320) for transmission via the RF unit 306.

In other implementations, the switching module controls whether OFDM2 or OFDM1 information is transmitted via the IFFT unit 304 and/or via RF unit 306. For example, when the switching module determines that OFDM2 information needs to be transmitted (e.g. when a W-Fi beacon needs to be sent to reserve the channel for a subsequent DRS transmission), the switching module routes the FDS signal 322 (or TDS signal 326) containing the OFDM2 information (e.g. the W-Fi beacon) to the IFFT unit 304 (or OFDM1 RF 306) for transmission as a set of OFDM2 symbols. Conversely, when the switching module determines that OFDM1 information needs to be transmitted (e.g. the subsequent DRS transmission), the switching module instead routes the output of the OFDM1 transmission chain 302 containing the OFDM1 information (e.g. the W-Fi beacon) to the IFFT unit 304 for transmission via the OFDM1 RF 306 as a set of OFDM1 symbols.

In some implementations, prior to determining that OFDM1 and/or OFDM2 information needs to be transmitted, a channel availability check is performed first (e.g. by a receiver in communication with the OFDM1 transmitter 300) to determine whether the transmission channel or band used is free. This check may be based on whether a carrier wave, signal or energy can be detected in the channel or band of interest (e.g. with a −62 dBm threshold). If no carrier or energy is detected, the OFDM1 transmitter 300 transmits the first and second OFDM1 signals 320, 322 (or 326) concurrently or in sequence. In some implementations, the switching module may rely on a channel availability indication provided by a channel availability unit (not shown) before it can determine that OFDM1 and/or OFDM2 information can be transmitted.

In some implementations, it may be desirable for the OFDM1 transmitter 300 to occupy the channel as soon as possible after the channel availability check to ensure that other receivers do not consider the channel as free before the OFDM1 transmitter had a chance to begin its own OFDM2 transmission. In implementations where a delay is inevitable, the OFDM1 transceiver 300 may be configured to transmit a time-domain signal that can be fed directly into the OFDM1 RF unit 306 until the desired OFDM2 information becomes available for transmission. For example, if the desired OFDM2 information is in the form of a frequency domain signal (FDS) that needs to go through the IFFT unit 304 (e.g. after having been generated in the OFDM2 signal generator 312 and processed in the TD interpolator 314 and/or read from the signal memory 316), the switching module may be configured, when it receives a positive channel availability indication, to route a repeatable time-domain signal directly into the RF unit 306 until the desired OFDM2 information is ready for transmission. In some implementations, the repeatable time-domain signal is another OFDM1 signal containing OFDM2 information which has a repetitive or cyclical pattern. In one example, the repeatable OFDM2 information is a sequence of LTFs and/or STFs. Other possibilities exist for the repeatable time-domain signal used prior to transmitting the desired OFDM2 information. In other implementations, the repeatable time-domain signal is transmitted during the frame alignment period 136, 908.

Figure 9A:
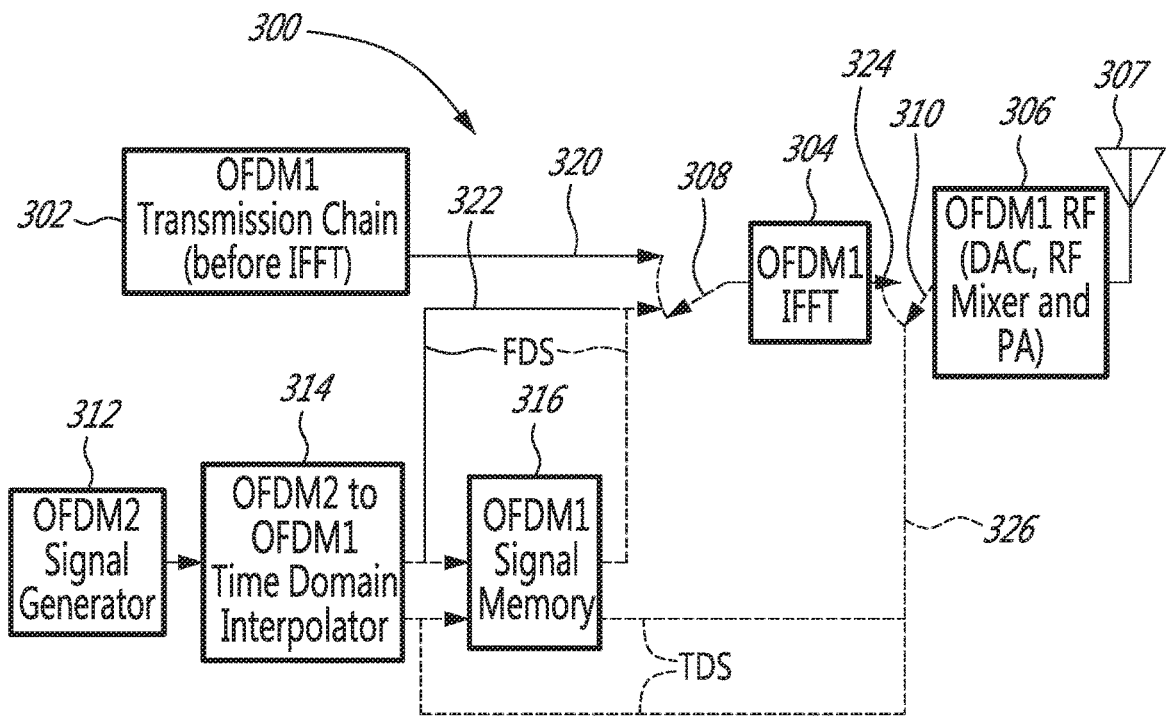
FIGS. 9A-B illustrate block diagram examples of an OFDM transmitter configured in accordance with the principles described herein.
Figure 10:
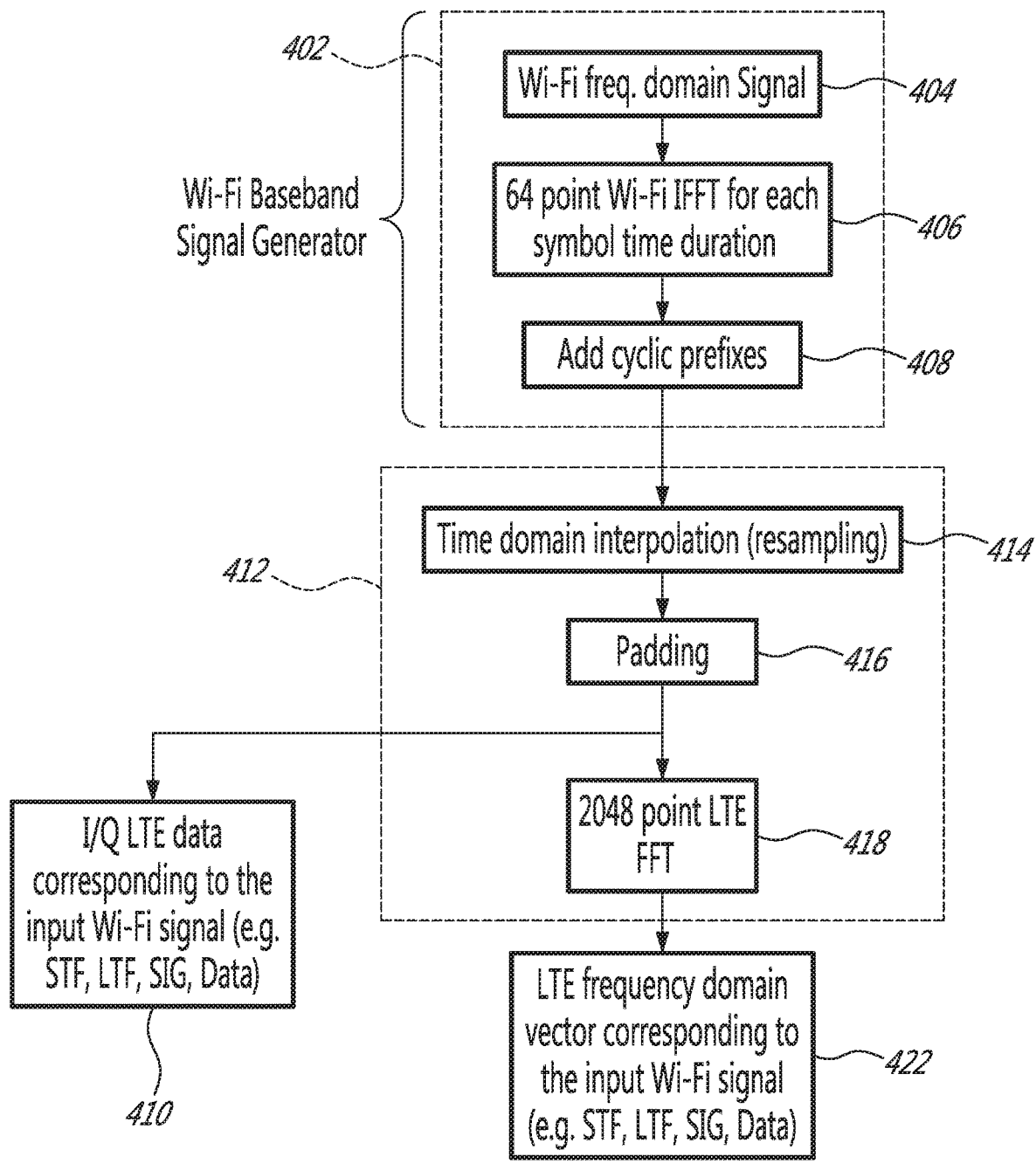
FIG. 10 illustrates a block diagram example for the signal generator and time-domain interpolator of the OFDM transmitter shown in FIG. 9A, configured in accordance with the principles described herein.

FIG. 10 shows a block diagram example of a configuration for the OFDM2 signal generator 312 and OFDM2-OFDM1 TD interpolator 314 of FIG. 9A to generate and interpolate a W-Fi signal into an LTE signal in the time domain, in accordance to principles described herein. In this example, a W-Fi signal generator 402 includes a 64-point W-Fi IFFT unit 406 that is configured to perform an IFFT for each symbol time duration of a frequency-domain W-Fi signal 404 carrying pre-determined or defined W-Fi information (e.g. a W-Fi header or packet). The W-Fi signal generator 402 also includes a CP unit 408 that is configured to add a CP to each W-Fi symbol generated to create a set of W-Fi symbols carrying the pre-determined W-Fi information.

The W-Fi symbol set is fed into a LTE time-domain interpolator 412 that includes a re-sampling unit 414 configured to resample (e.g. by time-domain interpolation or low pass filtering) the W-Fi symbol set to produce a time-domain LTE signal 420 (e.g. C-PRI I/Q data). The LTE time-domain interpolator 412 may, in some implementations, include a padding unit 416 to pad the LTE signal 420 to turn it into an LTE I/Q vector (e.g. the TDS signal of FIG. 9A) that can be processed by conventional LTE RF circuitry (e.g. the OFDM1 RF unit 306 of FIG. 9A). In other implementations, the LTE time-domain interpolator 412 may further include an LTE FFT unit 418 to obtain a corresponding LTE signal 422 in the frequency-domain (e.g. the FDS signal 322 of FIG. 9A) that can be processed by conventional LTE IFFT circuitry (e.g. the OFDM1 IFFT unit 304 of FIG. 9A). In yet other implementations, the LTE FFT unit 418 has an input size equal to the total size of the W-Fi symbols in the W-Fi symbol set and an output equal to the number of LTE subcarriers (e.g. 2048). Alternatively, the LTE FFT unit 418 used is the same as that used in a conventional LTE receiving chain. Other implementations are possible.

Returning to FIG. 9B, there is shown a different OFDM1 transmitter configuration which can be used if frequency-domain interpolation is preferred. Similarly to the OFDM1 transmitter 300, the OFDM1 transmitter 350 is configured to generate and transmit first and second OFDM1 signals 370 and 372 (or 376) and includes an OFDM1 transmission chain 352, an OFDM1 IFFT unit 354, an OFDM1 RF unit 356, antenna(s) 357, and circuitry including an OFDM2 signal generator 362, OFDM2-OFDM1 interpolator 364 and/or an OFDM1 signal memory 366. Other than the nature of the interpolation performed (further details below), the OFDM1 transmitter 350 is configured according to all of the possible implementations described above in relation to the OFDM1 transmitter 300.

In some implementations, the OFDM1 transmitter 350 also includes a switch 358 (or 360) or switching module (not shown) that is configured as described above in relation to FIG. 9A e.g. to determine when OFDM2 information needs to be transmitted (with or without a prior channel availability check). Based on that determination, the switching module is also configured to route the FDS (or TDS) signal 372 (or 376) containing the OFDM2 information (e.g. the W-Fi beacon) to the OFMD1 IFFT unit 354 (or OFDM1 RF 306) or route the OFDM1 transmission chain output (e.g. the subsequent DRS) for transmission via the RF unit 356. Other possibilities exit for the switching module including all of those described above in relation to the FIG. 9A.

Figure 9B:
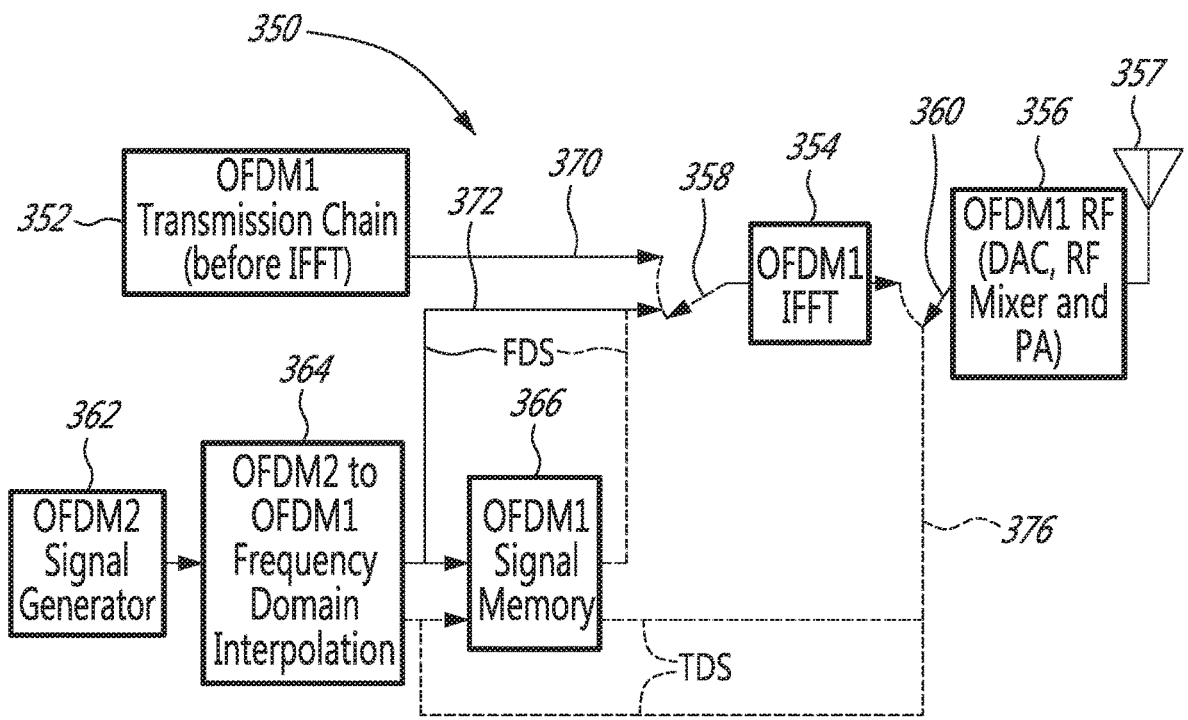
Figure 11:
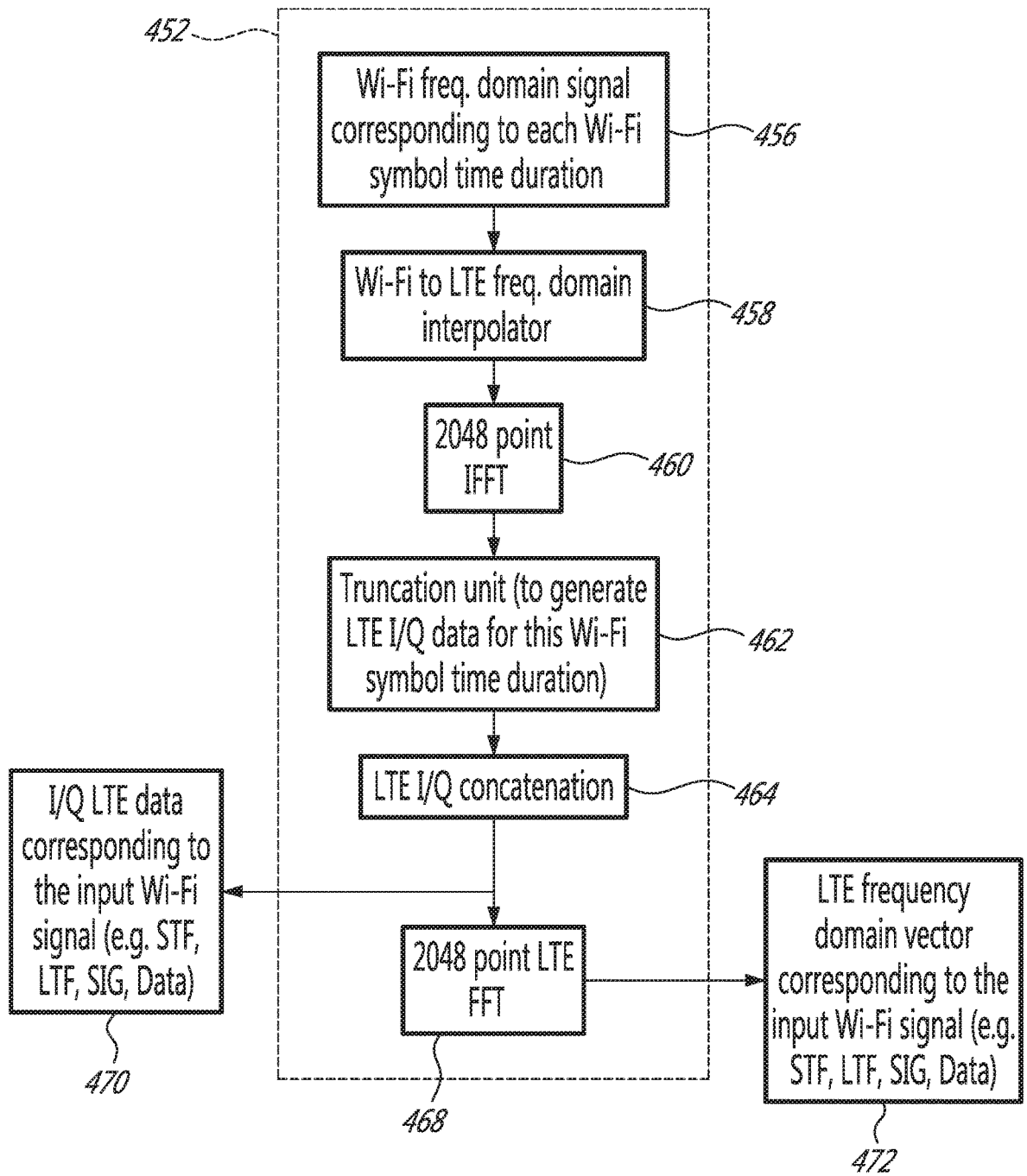
FIG. 11 illustrates a block diagram example for the frequency-domain interpolator of the OFDM transmitter shown in FIG. 9B, configured in accordance with the principles described herein.

FIG. 11 shows a block diagram example of a configuration for the OFDM2-OFDM1 FD interpolator 364 of FIG. 9B denoted as FD interpolation unit 452 which is configured to interpolate, in the frequency domain, a W-Fi signal 456 carrying pre-determined or defined W-Fi information (e.g. a W-Fi beacon) into an LTE signal 470, 472. In this example, the FD interpolation unit 452 includes a symbol interpolator 458 that interpolates on a W-Fi symbol-by-symbol basis i.e. one W-Fi symbol at a time. In one implementation, the symbol interpolator 458 interpolates the N (e.g. 64) W-Fi subcarriers into M (e.g. 2048) LTE subcarriers using the following "sinc" function:

$$\text{LTE\_Subcarrier}(m) = \sum_{n=-32}^{32} \text{Wi-Fi\_subcarrier}(n) \times \text{sinc}\left(\left[m - \left(\frac{312.5}{15}\right)n\right]\right)$$

$$m = -1024, \ldots, 1024$$

where:

$$\text{sinc}(x) = \frac{\sin \pi x}{\pi x}$$

However, this is only one function example for the symbol interpolator 458. Other frequency interpolation functions may be used to map N subcarriers into M LTE subcarriers.

The symbol interpolator 458 takes as input the Wi-Fi signal 456 in the frequency domain that corresponds to one Wi-Fi symbol time duration. The output is fed into an LTE IFFT unit 460 which produces a set of M time-domain samples (e.g. 2048) which span over one LTE symbol duration. In some implementations, the time-domain set of M samples is truncated in truncation unit 464 (e.g. by selecting a subset of samples (e.g. 98)) to correspond to one Wi-Fi symbol duration (e.g. 3.2 ρs) thereby producing LTE I/Q data corresponding to the one Wi-Fi symbol duration processed by the symbol interpolator 458. The FD interpolation unit 452 also includes a concatenation unit 464 that concatenates the LTE I/Q data produced with any LTE I/Q data that might have been produced for Wi-Fi symbols previously processed by the interpolator 452. The Wi-Fi symbols are thus processed in the FD interpolation unit 452 until all of the Wi-Fi symbols in the Wi-Fi signal have been processed. The concatenation unit 464 produces a time-domain LTE signal or I/Q vector 470 (e.g. the TDS signal of FIG. 7B) formed of the concatenated LTE I/Q data corresponding to the entire Wi-Fi signal) so that it can then be processed by conventional LTE RF circuitry (e.g. the OFDM1 RF unit 356 of FIG. 7B). The FD interpolating unit 452 may, in some implementations, include an LTE FFT unit 468 to obtain a corresponding LTE signal 472 in the frequency-domain (e.g. the FDS signal 372 of FIG. 9B) that can be processed by conventional LTE IFFT circuitry (e.g. the OFDM1 IFFT unit 354 of FIG. 9B). Alternatively, the LTE FFT unit 468 is the same as that used in in a conventional LTE receiving chain. Other implementations are possible.

Figure 12A:
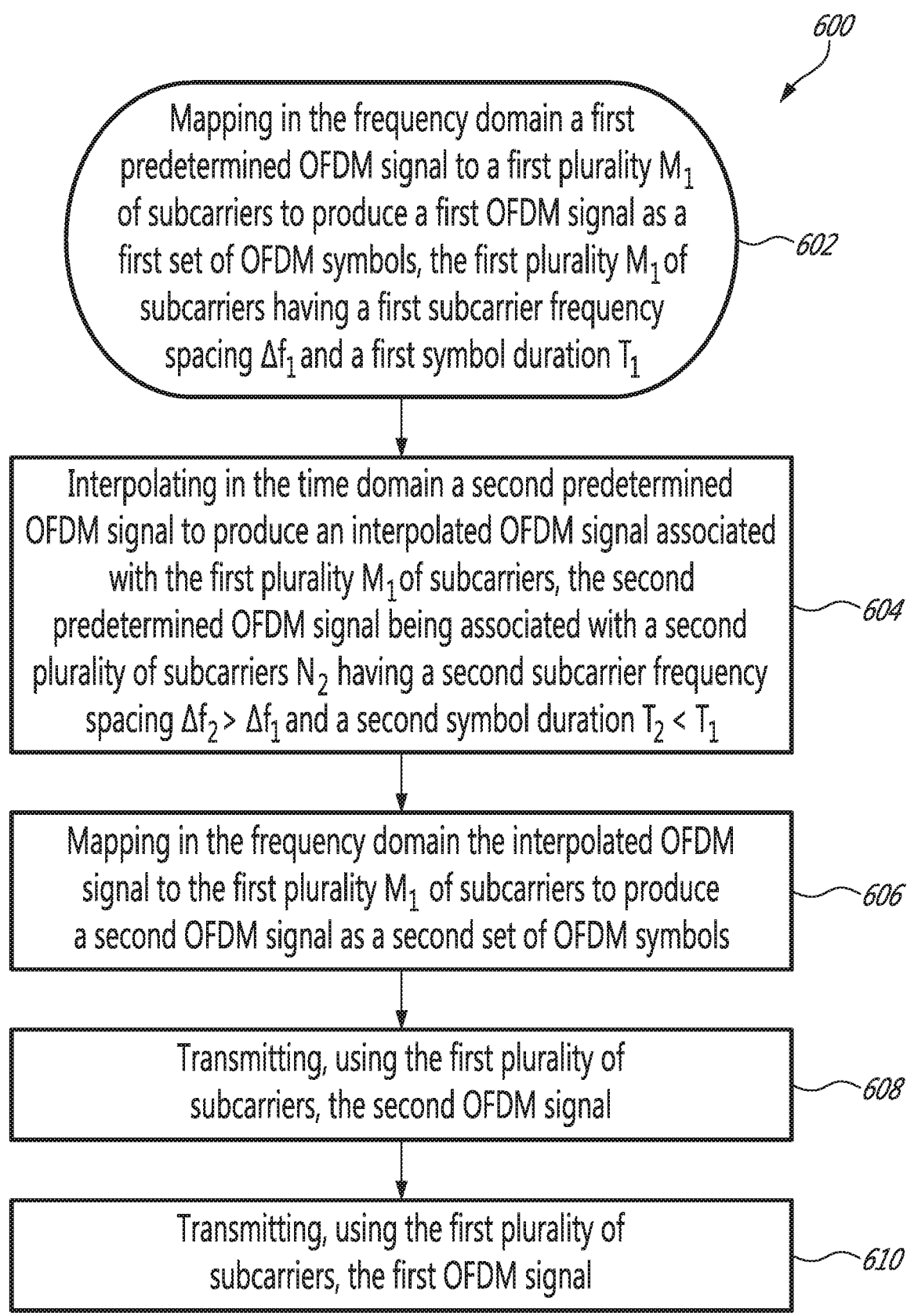
FIGS. 12A-B show a flow chart of example methods for the OFDM transmitters of FIGS. 9A-B in accordance with the principles described herein.

FIG. 12A shows an example method 600 for the OFDM transmitter 300 of FIG. 9A. In this method, the OFDM transmitter 300 is assumed to be configured for OFDM signal transmissions using a first plurality of subcarriers $M_1$ having a first subcarrier frequency spacing $\Delta f_1$ defining a first symbol duration $T_1$. At step 602, the method 600 includes mapping in the frequency domain a first predetermined OFDM signal to a first plurality $M_1$ of subcarriers to produce a first OFDM signal as a first set of OFDM symbols, the first plurality $M_1$ of subcarriers having a first subcarrier frequency spacing $\Delta f_1$ and a first symbol duration $T_1$. At step 604, the method further includes interpolating in the time domain a second predetermined OFDM signal to produce an interpolated OFDM signal associated with the first plurality $M_1$ of subcarriers, the second predetermined OFDM signal being associated with a second plurality of subcarriers $N_2$ having a second subcarrier frequency spacing $\Delta f_2 > \Delta f_1$ and a second symbol duration $T_2 < T_1$. At step 606, the method further includes mapping in the frequency domain the interpolated OFDM signal to the first plurality $M_1$ of subcarriers to produce a second OFDM signal a second set of OFDM symbols. Finally, at step 608, the method includes transmitting, using the first plurality $M_1$ of subcarriers, the second OFDM signal and at step 610, transmitting, using the first plurality $M_1$ of subcarriers, the first OFDM signal s.

In some implementations, the method 600 includes, prior to mapping the interpolated OFDM signal to the first plurality $M_1$ of subcarriers, performing an $M_1$ point FFT of the interpolated OFDM signal. In other implementations, the method 600 further includes performing an $M_1$ point IFFT of the first and second OFDM signals for transmission during one or more first symbol durations $T_1$. In other implementations, the second predetermined OFDM signal includes a plurality of second OFDM symbols, each represented by $N_2$ points where $N_2$ is smaller than $M_1$. In other implementations, the interpolating of the second predetermined OFDM signal includes resampling the predetermined OFDM signal to obtain $M_1$ points. In yet other implementations, the second predetermined OFDM signal is generated using an $N_2$ point IFFT. In other implementations, the second predetermined OFDM signal is read from a memory.

In some implementations, $M_1$ is a number of LTE subcarriers and $N_2$ is a number of Wi-Fi subcarriers. In other implementations, $M_1 = 2048$, $\Delta f_1 = 15$ KHz, $T_1 = 66.7$ us, $N_2 = 64$, $\Delta f_2 = 312.5$ KHz and $T_2 = 3.2$ us. Other implementations are possible.

Figure 12B:
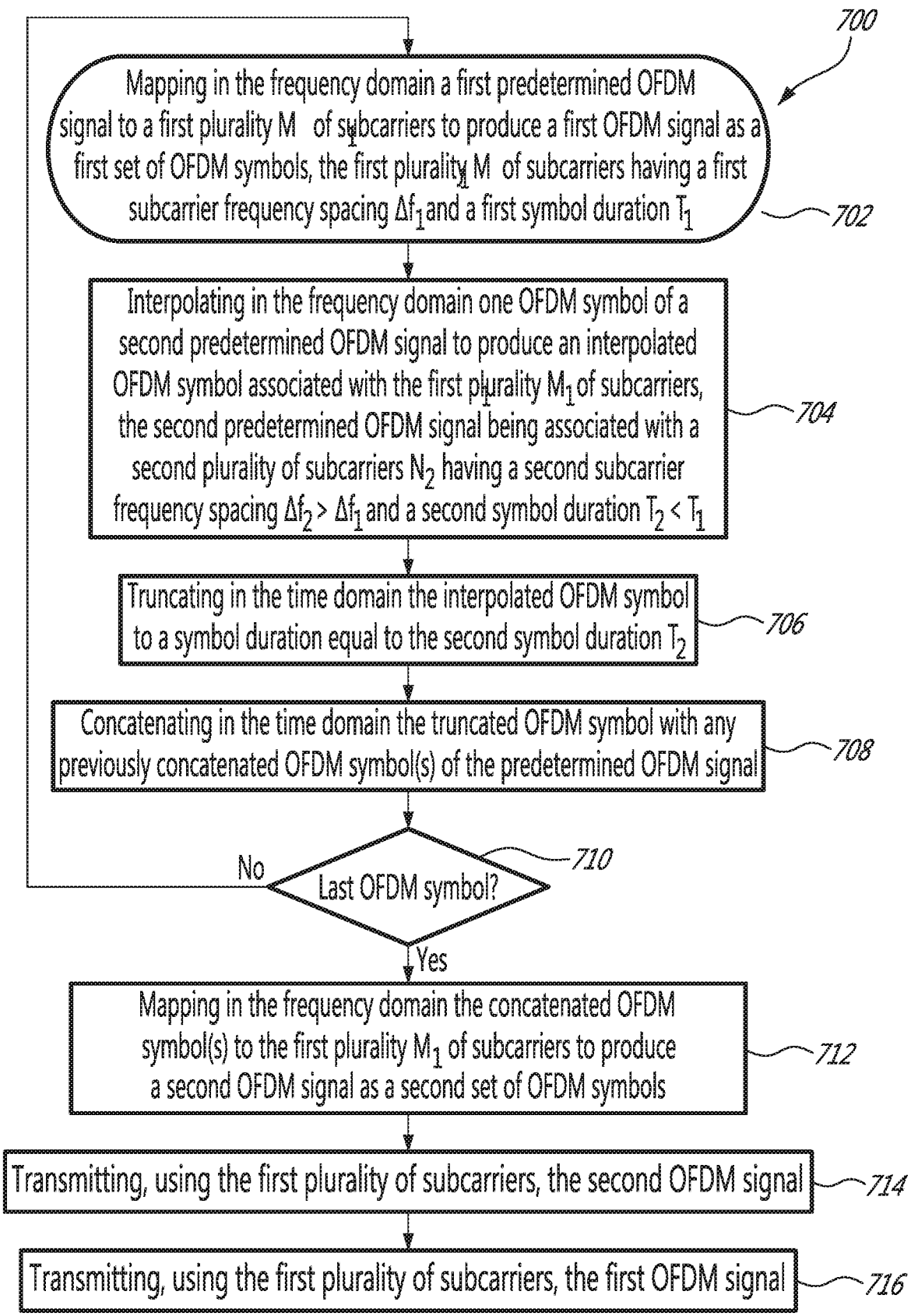

FIG. 12B shows an example method 700 for the OFDM transmitter 350 of FIG. 9B. In this method, the OFDM transmitter 350 is assumed to be configured for OFDM signal transmissions using a first plurality of subcarriers $M_1$ having a first subcarrier frequency spacing $\Delta f_1$ defining a first symbol duration The method 700 includes a set of steps 702, 704, 706, 708 which are performed for each one of a plurality of OFDM symbols of a second predetermined OFDM signal, the OFDM symbols being associated with a second plurality of subcarriers $N_2$ having a second subcarrier frequency spacing $\Delta f_2 > \Delta f_1$ and a second symbol duration $T_2 < T_1$. First, the method 700 includes at step 702, mapping in the frequency domain a first predetermined OFDM signal to the first plurality $M_1$ of subcarriers to produce a first OFDM signal as a first set of OFDM symbols, the first plurality $M_1$ of subcarriers having a first subcarrier frequency spacing $\Delta f_1$ and a first symbol duration $T_1$. At step 704, the method includes interpolating in the frequency domain one OFDM symbol of a second predetermined OFDM signal to produce an interpolated OFDM symbol associated with the first plurality $M_1$ of subcarriers, the second predetermined OFDM signal being associated with the second plurality of subcarriers $N_2$ having a second subcarrier frequency spacing $\Delta f_2 > \Delta f_1$ and a second symbol duration $T_2 < T_1$. The method further includes at step 706 truncating in the time domain the interpolated OFDM symbol (after conversion into the time domain e.g. using an IFFT) to a symbol duration equal to the second symbol duration $T_2$. At step 708, the method includes concatenating in the time domain the truncated OFDM symbol with any previously concatenated OFDM symbol(s) of the predetermined OFDM signal. If at step 710, steps 702-708 were performed for the last of the plurality of OFDM symbols, the method 700 goes to step 712 where it includes mapping in the frequency domain the concatenated OFDM symbol(s) to the first plurality $M_1$ of subcarriers to produce a second OFDM signal as a second set of OFDM symbols and finally at step 714, transmitting, using the first plurality $M_1$ of subcarriers, the second OFDM signal and at step 716, transmitting, using the first plurality $M_1$ of subcarriers, the first OFDM signal. Otherwise, the method 700 goes back and performs steps 702-708 for the next OFDM symbol until all of the OFDM symbols have been processed.

In some implementations, the method further includes prior to mapping in the frequency domain the concatenated OFDM symbol(s), performing an $M_1$ point FFT of the concatenated OFDM symbol(s). In other implementations, the method 700 further includes performing an $M_1$ point IFFT of the first and second OFDM signals for transmission during one or more first symbol durations In some implementations, the symbol interpolating is performed in accordance with the following function:

$$\text{Base\_Subcarrier}(m) = \sum_{n=-32}^{32} \text{Second\_Subcarrier}(n) \times \text{sinc}\left(\left[m - \left(\frac{312.5}{15}\right)n\right]\right)$$

$$m = -1024, \ldots, 1024$$

where:

$$sinc(x) = \frac{\sin \pi x}{\pi x}$$

In some implementations, $M_1$ is a number of LTE subcarriers and $N_2$ is a number of Wi-Fi subcarriers. In other implementations, $M_1 = 2048$, $\Delta f_1 = 15$ KHz, $T_1 = 66.7$ ρs, $N_2 = 64$, $\Delta f_2 = 312.5$ KHz and/or $T_2 = 3.2$ us. Other implementations are possible.

Simulation tests have shown that OFDM2 symbol information (e.g. Wi-Fi symbol information) generated as an OFDM1 signal based on the principles described above can be received and demodulated by an OFDM2 receiver (e.g. Wi-Fi) despite the fact that they have been generated by an OFDM1 transmitter (e.g. LTE) with OFDM1 subcarriers. In some implementations, an OFDM2 receiver is configured to receive, using N OFDM2 subcarriers, OFDM2 symbol information generated with M (or less than M) OFDM1 subcarriers. In other implementations, the OFDM2 receiver includes an N-point FFT to receive the OFDM2 symbol information which was generated with an M-point IFFT in the OFDM1 transmitter. In yet other implementations, the OFDM2 receivers is configured to receive, using N OFDM2 subcarriers, OFDM2 symbol information or an OFDM2 symbol set generated with M (or less than M) OFDM1 subcarriers. Other possibilities exist for the OFDM2 receiver. In yet other implementations, the OFDM2 symbol information includes predetermined OFDM2 information (e.g. a W-Fi beacon) which is indicative of one of a transmission length, transmission time, transmission type, a channel reservation time and a contention-free period associated with an OFDM1 symbol set transmitted after the OFDM2 symbol set. Other possibilities exist for the OFDM2 receiver.

Figure 13:
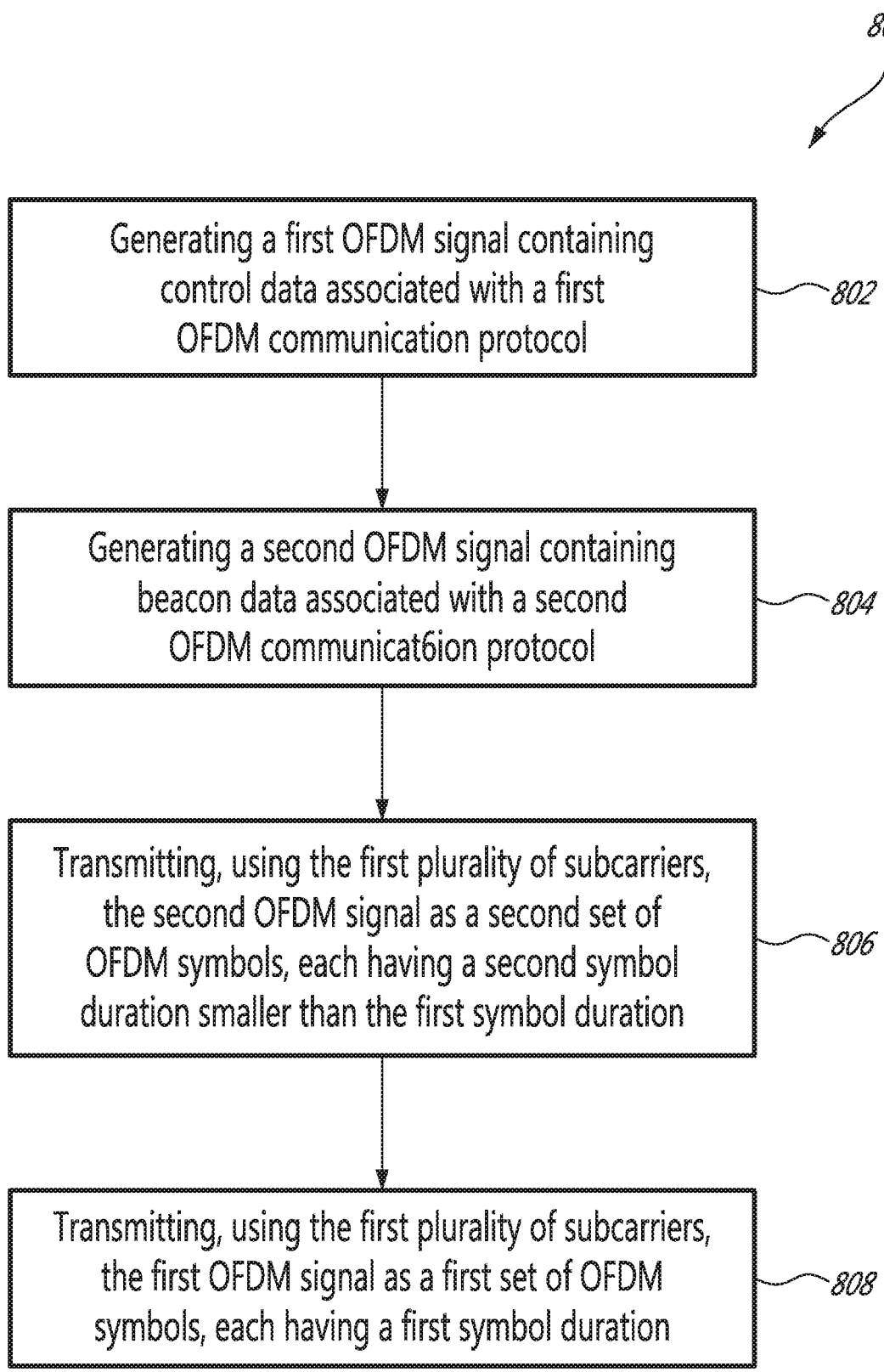
FIG. 13 shows a flow chart of another example method for the OFDM transmitters of FIGS. 9A-B in accordance with the principles described herein.

FIG. 13 shows a flow chart of another example method 800 for the OFDM transmitters 300, 350 of FIGS. 9A-B in accordance with the principles described herein. In this method, the OFDM transmitters 300, 350 are assumed to be configured for transmission of a first set of OFDM symbols using a first plurality of subcarriers having a first subcarrier frequency spacing defining a first symbol duration. At step 802, the method 800 includes generating a first OFDM signal containing control data (e.g. a DRS) associated with a first OFDM communication protocol. At step 804, the method further includes generating a second OFDM signal containing beacon data (e.g. a W-Fi beacon) associated with a second OFDM communication protocol. At step 806, the method further includes transmitting, using the first plurality of subcarriers, the second OFDM signal as a second set of OFDM symbols, each having a second symbol duration smaller than the first symbol duration and at step 808, transmitting, using the first plurality of subcarriers, the first OFDM signal as a first set of OFDM symbols, each having a first symbol duration.

Figures 14A, 14B:
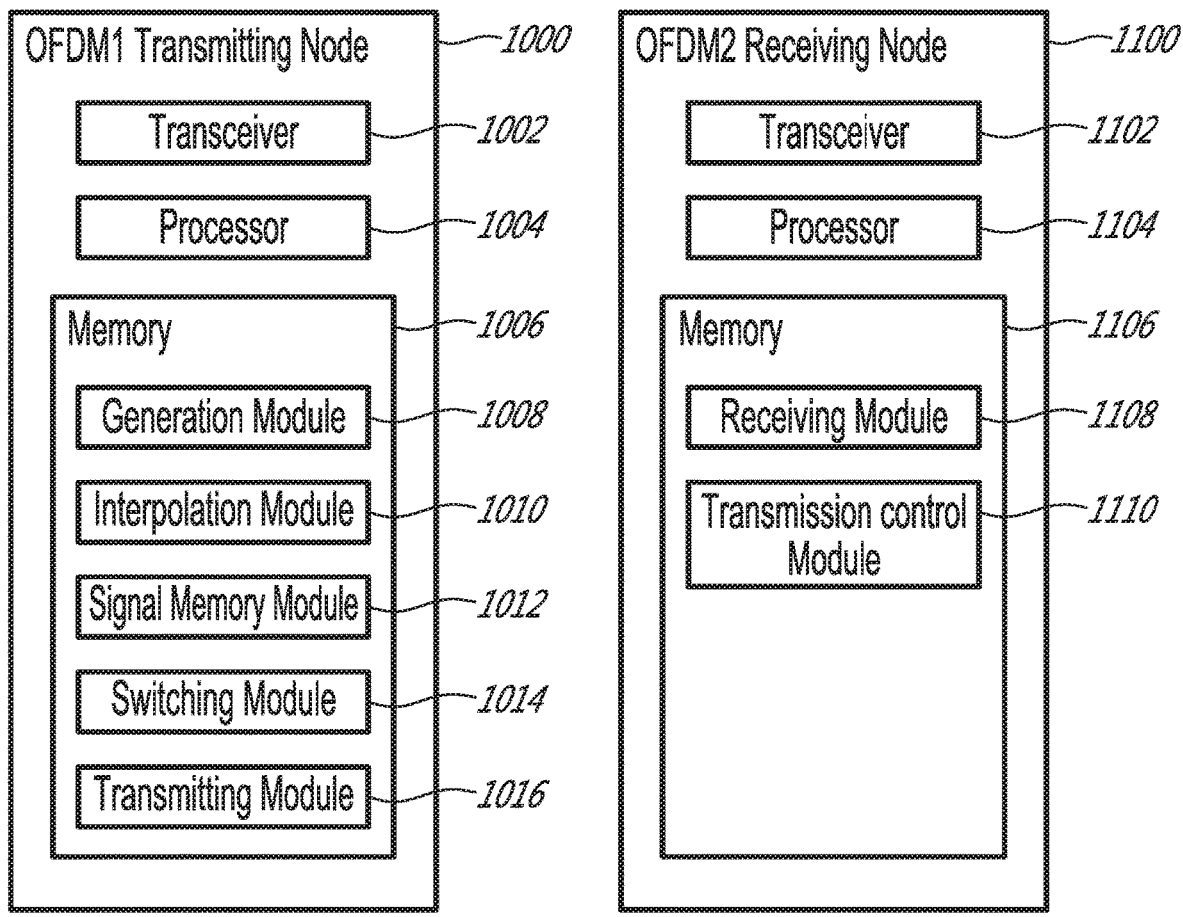
FIGS. 14A-B show a block diagram of exemplary embodiments of OFDM transmitting and receiving nodes configured in accordance with principles described herein.

FIGS. 14A-B are block diagrams of exemplary embodiments of respectively a (first) OFDM1 transmitting node 1000 (e.g. an LTE transmitter) and an OFDM2 receiving node (e.g. a W-Fi receiver) configured respectively to transmit and receive OFDM2 symbol information generated using OFDM1 subcarriers in accordance with the principles of the present disclosure.

As illustrated in FIG. 14A, OFDM1 transmitting node 1000 includes a transceiver 1002, one or more processor(s) 1004, memory 1006 which includes one or more of a generation module 1008, an interpolation module 1010, a signal memory module 1012 a switching module 1014 and a transmitting module 1016. In one embodiment, the transceiver 1002 may be replaced by a transmitter and a receiver (not shown). The generation module 1008 is configured to perform the signal generation functionality described above which includes generating a first OFDM1 signal containing predetermined OFDM1 information (e.g. a DRS) and a second OFDM1 signal containing predetermined OFDM2 information (e.g. a W-Fi beacon). The interpolation module 1010 is configured to perform the interpolation functionality described above, which includes interpolating a predetermined OFDM2 signal generated to produce a second OFDM1 signal that contains the predetermined or defined OFDM2 information. The signal memory module 1012 is configured to perform the storing functionality described above which includes storing the second OFDM1 signal that contains the OFDM2 information. The switching module 1014 is configured to perform the switching functionality described above, which includes routing the second OFDM1 signal containing the OFDM2 information for transmission as a second set of OFDM symbols or routing the first OFDM1 signal for transmission as a first set of OFDM symbols. The transmitting module 1016 is configured to perform the transmitting functions described above which includes transmitting using the M OFDM1 subcarriers, the second OFDM signal as a second set of OFDM symbols and the first OFDM1 signal as a first set of OFDM symbols.

Depending on the implementation, not all of the generation, interpolation, storing switching and/or transmitting functions need to be performed as noted above and as such, some of these modules may be optional. For example, in one implementation, the OFDM2 information is stored in the signal memory module 1012 in advance, and the memory 1006 only includes the signal memory module 1012 the switching module 1014 and the transmitting module 1016 respectively performing the functions described above. The generation module 1008, interpolation module 1010, signal memory module 1012, switching module 1014 and transmitting module 1016 are implemented at least partially in the memory 1006 in the form of software or (computer-implemented) instructions executed by the processor(s) 1004 within the OFDM1 transmitting node 1000 or distributed across two or more nodes (e.g., the OFDM1 transmitting node 1000 and another node). In another example, the processor(s) 1004 includes one or more hardware components (e.g., Application Specific Integrated Circuits (ASICs)) that provide some or all of the generation, interpolation, storing, switching and transmitting functionality described above. In another embodiment, the processor(s) 1004 include one or more hardware components (e.g., Central Processing Units (CPUs)), and some or all of the generation, interpolation, storing, switching and transmitting functionality described above is implemented in software stored in, e.g., the memory 1006 and executed by the processor 1004. In yet another embodiment, the processor(s) 1004 and memory 1006 form processing means (not shown) configured to perform the generation, interpolation, storing, switching and transmitting functionality described above.

As illustrated in FIG. 14B, OFDM2 receiving node 1100 includes a transceiver 1102, one or more processor(s) 1104, and memory 1106 which includes a receiving module 1108, and a transmission control module 1110. In one embodiment, the transceiver 1102 may be replaced by a transmitter and a receiver (not shown). The receiving module 1108 is configured to perform the receiving functionality described above which, as noted above includes receiving using OFDM2 subcarriers, an OFDM1 signal containing OFDM2 information transmitted from an OFDM1 transmitting unit using OFDM1 subcarriers. The transmission control module 1110 which may be optional depending on the implementation, is configured to perform the transmission control functionality described above, which includes determining if the OFDM1 signal contains beacon data indicative of one of a transmission length, a transmission time, a transmission type, a channel reservation time and a contention-free period associated with the OFDM1 signal transmission and at least one of a downlink OFDM transmission and an uplink OFDM transmission and if so, refraining from transmitting based on the beacon data received.

The receiving module 1108 and transmission control module 1110 are implemented at least partially in the memory 1106 in the form of software or (computer-implemented) instructions executed by the processor(s) 1104 within the OFDM2 receiving node 1100 or distributed across two or more nodes (e.g., the OFDM2 receiving node 1100 and another node or device). In another example, the processor(s) 1104 includes one or more hardware components (e.g., Application Specific Integrated Circuits (ASICs)) that provide some or all of the receiving and transmission control functionality described above. In another embodiment, the processor(s) 1104 include one or more hardware components (e.g., Central Processing Units (CPUs)), and some or all of the receiving and transmission control functionality described above is implemented in software stored in, e.g., the memory 1106 and executed by the processor 1104. In yet another embodiment, the processor(s) 1104 and memory 1106 form processing means (not shown) configured to perform the receiving and transmissions control functionality described above.

Figures 15A, 15B:
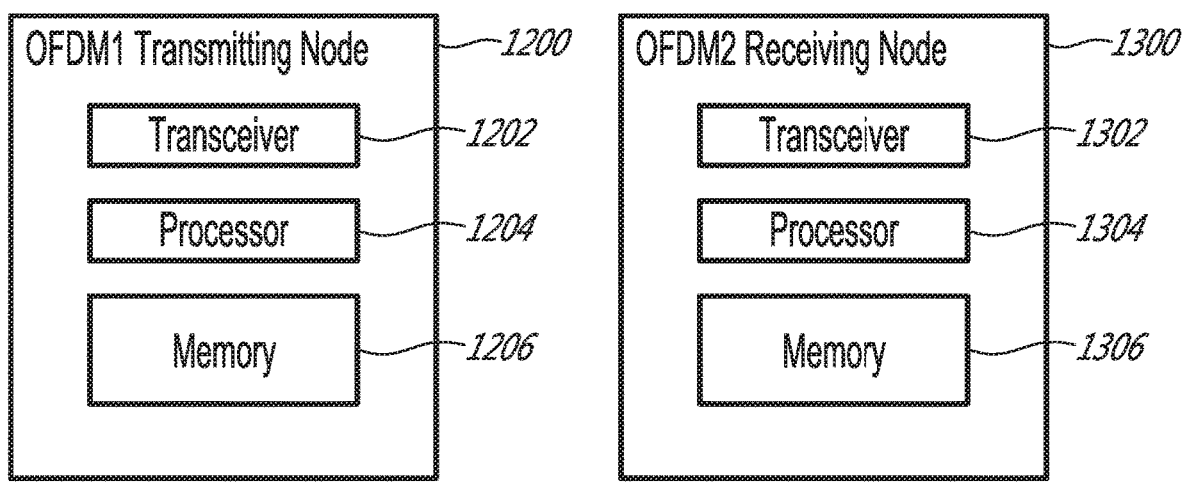
FIGS. 15A-B show a block diagram of other exemplary embodiments of OFDM transmitting and receiving nodes configured in accordance with the principles described herein.

FIGS. 15A-B show a variant for each of the OFDM transmitting and receiving node examples of FIGS. 14A-B, denoted respectively as OFDM transmitting node 1200, and ODFM receiving node 1300. Each of the nodes, 1200, 1300 includes a transceiver 1202, 1302 and circuitry containing (computer-implemented) instructions which when executed by one or more processor(s) 11204, 1304 cause their respective node 1200, 1300 to perform some or all of the generation, interpolation, storing, switching, transmitting, receiving and transmission control functionality described above. In yet another variant, the circuitry includes the respective memory 1206, 1306 and processor(s) 1204, 1304 which, similarly to the example nodes 1000 and 1100 of FIGS. 14A-B may be implemented in many different ways. In one example, the memories 1206, 1306 contain instructions which, when executed, cause the respective node 1200, 1300 to perform some or all of their generation, interpolation, storing, switching, transmitting, receiving and transmission control functionality described above. Other implementations are possible.

OTHER EMBODIMENTS

In one broad aspect, there is provided a method for an OFDM transmitter or transmitting node configured for transmission of a first set of OFDM symbols using a first plurality of subcarriers having a first subcarrier frequency spacing defining a first symbol duration. The method includes generating a first OFDM signal containing control data associated with a first OFDM communication protocol, generating a second OFDM signal containing beacon data associated with a second OFDM communication protocol, transmitting, using the first plurality of subcarriers, the second ODFM signal as a second set of OFDM symbols, each having a second symbol duration smaller than the first symbol duration, and transmitting, using the first plurality of subcarriers, the first OFDM signal as a first set of OFDM symbols, each having a first symbol duration.

In one implementation, the first OFDM signal is generated based on a first predetermined OFDM signal containing the control data associated with the first OFDM communication protocol and the second OFDM signal is generated based on a second predetermined OFDM signal containing the beacon data associated with the second communication protocol.

In another implementation, generating the first OFDM signal includes mapping the first predetermined OFDM signal to the first plurality of subcarriers and generating the second OFDM signal includes mapping the second predetermined OFDM signal to the first plurality of subcarriers. In yet another implementation, generating the second OFDM signal further includes generating the second predetermined OFDM signal, and interpolating the second predetermined OFDM signal generated using the first plurality of subcarriers to produce an interpolated OFDM signal that can be mapped to the first plurality of subcarriers.

In yet another implementation, the first predetermined OFDM signal includes a first set of modulation values for the first plurality of subcarriers, the first set of modulation values corresponding to the control data associated with the first OFDM communication protocol, and the second predetermined OFDM signal includes a second set of modulation values for the first plurality of subcarriers, the second set of modulation values corresponding to the beacon data associated with the second OFDM communication protocol.

In yet another implementation, the first predetermined OFDM signal includes a periodic control signal and wherein the second predetermined OFDM signal includes a beacon frame. In yet another implementation, the first predetermined OFDM signal includes a Discovery Reference Signal (DRS).

In yet another implementation, the beacon frame is indicative of one of a transmission length, transmission time, transmission type, a channel reservation time and a contention-free period associated with at least the DRS. In yet another implementation, the beacon frame is indicative of one of a transmission length, transmission time, transmission type, a channel reservation time and a contention-free period associated with the first OFDM signal and at least one of a downlink OFDM transmission and an uplink OFDM transmission. In yet another implementation, the beacon frame includes a Hybrid Coordination Function (HCF) beacon.

In yet another implementation for example, where it may be desirable to broadcast the presence of the OFDM transmitter, the beacon frame includes at least one parameter for the OFDM transmitter associated with one of the first and second OFDM communication protocols. In yet another implementation, the at least one parameter for the OFDM transmitter and associated with the second OFDM communication protocol includes at least one of a Service Set Identifier (SSID), a supported rate, a country, a Quality of Service (QoS), a neighbor list, a radio Medium Access Control (MAC) address, an Ethernet MAC address, and a MAC address of an associated Access Point (AP). In yet another implementation, the at least one parameter for the OFDM transmitter and associated with the first OFDM communication protocol includes at least one of a Cell Identifier (CID), a transmit power, a received interference power and a thermal noise power, a phase/frequency synchronization status, a Transport Network (TN) bandwidth, a TN latency, a TN jitter, and a TN availability.

In another broad aspect, there is provided an OFDM transmitter or transmitting node configured for transmission of a first set of OFDM symbols using a first plurality of subcarriers having a first subcarrier frequency spacing defining a first symbol duration. The OFDM transmitter includes circuitry containing instructions which, when executed, cause the transmitter to perform any of the method implementations described above.

In yet another broad aspect, there is provided a non-transitory computer readable memory configured to store executable instructions for an OFDM transmitter or transmitting node configured for transmission of a first set of OFDM symbols using a first plurality of subcarriers having a first subcarrier frequency spacing defining a first symbol duration. The executable instructions when executed by a processor cause the OFDM transmitter to perform any of the method implementations described above.

In yet another broad aspect, there is provided an OFDM transmitter or transmitting node configured for transmission of a first set of OFDM symbols using a first plurality of subcarriers having a first subcarrier frequency spacing defining a first symbol duration. The OFDM transmitter includes a transceiver, a processor and a memory containing a generation module configured to generate a first OFDM signal containing control data associated with a first OFDM communication protocol and to generate a second OFDM signal containing beacon data associated with a second OFDM communication protocol. The memory also contains a transmitting module configured to transmit, using the first plurality of subcarriers, the second OFDM signal as a second set of OFDM symbols, each having a second symbol duration smaller than the first symbol duration. The transmitting module is also configured to transmit, using the first plurality of subcarriers, the first OFDM signal as a first set of OFDM symbols, each having a first symbol duration.

In one implementation, the first OFDM signal is generated based on a first predetermined OFDM signal containing the control data associated with the first OFDM communication protocol and the second OFDM signal is generated based on a second predetermined OFDM signal containing the beacon data associated with the second communication protocol.

In another implementation, the generation module is further configured to map the first predetermined OFDM signal to the first plurality of subcarriers to generate the first OFDM signal and to map the second predetermined OFDM signal to the first plurality of subcarriers to generate the second OFDM signal. In yet another implementation, the generation module is configured to generate the second predetermined OFDM signal, and the memory further includes an interpolation module configured to interpolate the second predetermined OFDM signal generated using the first plurality of subcarriers to produce an interpolated OFDM signal that can be mapped to the first plurality of subcarriers to produce the second OFDM signal. In yet another implementation, the memory further includes a subcarrier mapping module configured to map the first and second predetermined OFDM signals to the first plurality of subcarriers. In yet another implementation, the subcarrier mapping module includes a IFFT module.

In yet another implementation, the first predetermined OFDM signal includes a first set of modulation values for the first plurality of subcarriers, the first set of modulation values corresponding to the control data associated with the first OFDM communication protocol, and the second predetermined OFDM signal includes a second set of modulation values for the first plurality of subcarriers, the second set of modulation values corresponding to the beacon data associated with the second OFDM communication protocol.

In yet another implementation, the first predetermined OFDM signal includes a periodic control signal and wherein the second predetermined OFDM signal includes a beacon frame. In yet another implementation, the first predetermined OFDM signal includes a Discovery Reference Signal (DRS).

In yet another implementation, the beacon frame is indicative of one of a transmission length, transmission time, transmission type, a channel reservation time and a contention-free period associated with at least the DRS. In yet another implementation, the beacon frame is indicative of one of a transmission length, transmission time, transmission type, a channel reservation time and a contention-free period associated with the first OFDM signal and at least one of a downlink OFDM transmission and an uplink OFDM transmission. In yet another implementation, the beacon frame includes a Hybrid Coordination Function (HCF) beacon.

In yet another implementation for example, where it may be desirable to broadcast the presence of the OFDM transmitter, the beacon frame includes at least one parameter for the OFDM transmitter associated with one of the first and second OFDM communication protocols. In yet another implementation, the at least one parameter for the OFDM transmitter and associated with the second OFDM communication protocol includes at least one of a Service Set Identifier (SSID), a supported rate, a country, a Quality of Service (QoS), a neighbor list, a radio Medium Access Control (MAC) address, an Ethernet MAC address, and a MAC address of an associated Access Point (AP). In yet another implementation, the at least one parameter for the OFDM transmitter and associated with the first OFDM communication protocol includes at least one of a Cell Identifier (CID), a transmit power, a received interference power and a thermal noise power, a phase/frequency synchronization status, a Transport Network (TN) bandwidth, a TN latency, a TN jitter, and a TN availability.

In yet other implementations, the generation module, the interpolation module, the subcarrier mapping module and the transmitting module are configured to perform any of the generating, interpolating, mapping and/or transmitting functionality described above in relation to any of the method embodiments.

In yet other implementations, the first and second OFDM signals, the first and second predetermined OFDM signals, and the first plurality of subcarriers are characterized as described above in relation to any of the method embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the present disclosure.

The invention claimed is:

1. A method for an Orthogonal Frequency Division Multiplexing, OFDM, transmitter configured for transmission of a first set of OFDM symbols using a first plurality of subcarriers having a first subcarrier frequency spacing defining a first symbol duration, the method comprising:
generating a first OFDM signal containing control data associated with a first OFDM communication protocol;
generating a second OFDM signal containing beacon data associated with a second OFDM communication protocol;
transmitting, using the first plurality of subcarriers, the second ODFM signal as a second set of OFDM symbols, each having a second symbol duration smaller than the first symbol duration; and
transmitting, using the first plurality of subcarriers, the first OFDM signal as a first set of OFDM symbols, each having a first symbol duration,
wherein the first OFDM signal is generated based on a first predetermined OFDM signal containing the control data associated with the first OFDM communication protocol and the second OFDM signal is generated based on a second predetermined OFDM signal containing the beacon data associated with the second communication protocol, wherein generating the first OFDM signal comprises mapping the first predetermined OFDM signal to the first plurality of subcarriers and wherein generating the second OFDM signal comprises mapping the second predetermined OFDM signal to the first plurality of subcarriers.

2. The method of claim 1 wherein generating the second OFDM signal further comprises generating the second predetermined OFDM signal, and interpolating the second predetermined OFDM signal generated using the first plurality of subcarriers to produce an interpolated OFDM signal that can be mapped to the first plurality of subcarriers.

3. The method of claim 1 wherein the first predetermined OFDM signal comprises a first set of modulation values for the first plurality of subcarriers, the first set of modulation values corresponding to the control data associated with the first OFDM communication protocol, and wherein the second predetermined OFDM signal comprises a second set of modulation values for the first plurality of subcarriers, the second set of modulation values corresponding to the beacon data associated with the second OFDM communication protocol.

4. The method of claim 1 wherein the first predetermined OFDM signal comprises a periodic control signal and wherein the second predetermined OFDM signal comprises a beacon frame.

5. The method of claim 4 wherein the first predetermined OFDM signal comprises a Discovery Reference Signal (DRS).

6. The method of claim 4 wherein the beacon frame is indicative of one of a transmission length, transmission time, transmission type, a channel reservation time and a contention-free period associated with at least the DRS.

7. The method of claim 4 wherein the beacon frame is indicative of one of a transmission length, transmission time, transmission type, a channel reservation time and a contention-free period associated with the first OFDM signal and at least one of a downlink OFDM transmission and an uplink OFDM transmission.

8. The method of claim 4 wherein the beacon frame comprises at least one parameter for the OFDM transmitter associated with one of the first and second OFDM communication protocols.

9. An Orthogonal Frequency Division Multiplexing, OFDM, transmitter configured for transmission of a first set of OFDM symbols using a first plurality of subcarriers having a first subcarrier frequency spacing defining a first symbol duration, the OFDM transmitter comprising having circuitry containing instructions which, when executed, cause the OFDM transmitter to:
generate a first OFDM signal containing control data associated with a first OFDM communication protocol,
generate a second OFDM signal containing beacon data associated with a second OFDM communication protocol,
transmit, using the first plurality of subcarriers, the second ODFM signal as a second set of OFDM symbols, each having a second symbol duration smaller than the first symbol duration, and
transmit, using the first plurality of subcarriers, the first OFDM signal as a first set of OFDM symbols, each having a first symbol duration,
wherein the first OFDM signal is generated based on a first predetermined OFDM signal containing the control data associated with the first OFDM communication protocol and the second OFDM signal is generated based on a second predetermined OFDM signal containing the beacon data associated with the second communication protocol,
wherein to generate the first OFDM signal, the instructions are further configured to cause the OFDM transmitter to map the first predetermined OFDM signal to the first plurality of subcarriers and wherein to generate the second OFDM signal, the instructions are further configured to cause the OFDM transmitter to map the second predetermined OFDM signal to the first plurality of subcarriers.

10. The OFDM transmitter of claim 9 wherein to generate the second OFDM signal, the instructions are further configured to cause the OFDM transmitter to generate the second predetermined OFDM signal, and interpolate the second predetermined OFDM signal generated using the first plurality of subcarriers to produce an interpolated OFDM signal that can be mapped to the first plurality of subcarriers.

11. The OFDM transmitter of claim 9 wherein the first predetermined OFDM signal comprises a first set of modulation values for the first plurality of subcarriers, the first set of modulation values corresponding to the control data associated with the first OFDM communication protocol, and wherein the second predetermined OFDM signal comprises a second set of modulation values for the first plurality of subcarriers, the second set of modulation values corresponding to the beacon data associated with the second OFDM communication protocol.

12. The OFDM transmitter of claim 9 wherein the first predetermined OFDM signal comprises a periodic control signal and wherein the second predetermined OFDM signal comprises a beacon frame.

13. The OFDM transmitter of claim 12 wherein the first predetermined OFDM signal comprises a DRS.

14. The OFDM transmitter of claim 12 wherein the beacon frame is indicative of one of a transmission length, transmission time, transmission type, a channel reservation time and a contention-free period associated with at least the DRS.

15. The OFDM transmitter of claim 12 wherein the beacon frame is indicative of one of a transmission length, transmission time, transmission type, a channel reservation time and a contention-free period associated with the first OFDM signal {-320-} and at least one of a downlink OFDM transmission and an uplink OFDM transmission.

16. The OFDM transmitter of claim 12 wherein the beacon frame comprises at least one parameter for the OFDM transmitter associated with one of the first and second OFDM communication protocols.

* * * * *